(12) United States Patent
Park et al.

(10) Patent No.: US 11,366,213 B2
(45) Date of Patent: Jun. 21, 2022

(54) RADAR APPARATUS

(71) Applicant: Electronics and Telecommunications Research Institute, Daejeon (KR)

(72) Inventors: Pil Jae Park, Daejeon (KR); Seongdo Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 335 days.

(21) Appl. No.: 16/435,043

(22) Filed: Jun. 7, 2019

(65) Prior Publication Data
US 2019/0377079 A1    Dec. 12, 2019

(30) Foreign Application Priority Data

Jun. 8, 2018 (KR) .................. 10-2018-0066361
Sep. 21, 2018 (KR) .................. 10-2018-0113878

(51) Int. Cl.
*G01S 13/42* (2006.01)
*G01S 7/4865* (2020.01)
*G01S 13/44* (2006.01)

(52) U.S. Cl.
CPC ............ *G01S 13/44* (2013.01); *G01S 7/4865* (2013.01); *G01S 13/42* (2013.01)

(58) Field of Classification Search
CPC ......... G01S 13/44; G01S 7/4865; G01S 13/42
See application file for complete search history.

(56) References Cited

U.S. PATENT DOCUMENTS 9,581,688 B2    2/2017 Park et al.
2003/0146826 A1*  8/2003 Viana ..................... G01S 13/931
                                                              340/435

(Continued)

FOREIGN PATENT DOCUMENTS

JP          5493383 B2    5/2014
KR     1020180025131 A    3/2018

*Primary Examiner* — Donald H B Braswell
(74) *Attorney, Agent, or Firm* — Rabin & Berdo, P.C.

(57) ABSTRACT

Provided is a radar apparatus. The radar apparatus includes a controller configured to generate a variable delay control signal whose value varies with time, a clock generator configured to generate a transmission clock and a reception clock delayed by a delay time varying according to the variable delay control signal than the transmission clock, a transmitter configured to emit a transmission pulse through a transmission antenna based on the transmission clock, a first receiver configured to receive a first echo pulse that the transmission pulse is reflected from a target through a first reception antenna and configured to generate a first recovery signal corresponding to the first echo pulse based on the reception clock, and a second receiver configured to receive a second echo pulse that is the transmission pulse reflected from the target through a second reception antenna and configured to generate a second recovery signal corresponding to the second echo pulse based on the reception clock. The controller is configured to obtain a distance of the target based on at least one of a first delay time between the transmission clock and the reception clock corresponding to the first recovery signal and a second delay time between the transmission clock and the reception clock corresponding to the second recovery signal.

16 Claims, 14 Drawing Sheets

(56) References Cited

U.S. PATENT DOCUMENTS

| | | | |
|---|---|---|---|
| 2003/0151541 A1* | 8/2003 | Oswald | G01S 13/46 342/70 |
| 2009/0135051 A1* | 5/2009 | Bishop | G01S 13/867 342/175 |
| 2010/0207806 A1* | 8/2010 | Takahashi | G01S 13/18 342/109 |
| 2013/0162465 A1* | 6/2013 | Mukai | G01S 13/103 342/195 |
| 2015/0061922 A1* | 3/2015 | Kishigami | G01S 13/42 342/147 |
| 2015/0177364 A1* | 6/2015 | Rhee | G01S 13/42 342/195 |
| 2016/0103213 A1* | 4/2016 | Ikram | G01S 13/42 342/105 |
| 2017/0285138 A1 | 10/2017 | Park et al. | |
| 2018/0059232 A1 | 3/2018 | Park et al. | |

\* cited by examiner

RADAR APPARATUS

CROSS-REFERENCE TO RELATED APPLICATIONS

This U.S. non-provisional patent application claims priority under 35 U.S.C. § 119 of Korean Patent Application Nos. 10-2018-0066361, filed on Jun. 8, 2018, and 10-2018-0113878, filed on Sep. 21, 2018, the entire contents of which are hereby incorporated by reference.

BACKGROUND

The present disclosure herein relates to a radar apparatus, and more specifically, to a pulse radar apparatus that emits a pulse based on a clock signal and obtains information on a target from the pulse reflected from the target.

A pulse radar apparatus may repeatedly emit a transmission pulse based on a transmission clock, and recover an echo pulse that is obtained when a transmission pulse is reflected on a target and returned based on a reception clock. The pulse radar apparatus may obtain information on the target by analyzing the recovered echo pulse.

The pulse radar apparatus may analyze the echo pulse to obtain the target distance and azimuth information of the target. In order to obtain precisely the distance of the target (i.e., in order to implement a high distance resolution), the delay between the transmission clock and the reception clock must be finely adjusted. However, it is difficult to finely adjust the delay between the transmission clock and the reception clock. Further, in order to precisely obtain the azimuth angle of the target (i.e., in order to implement a high azimuth resolution), the pulse radar apparatus may include a plurality of receivers disposed at various positions. However, when a pulse radar apparatus includes a plurality of receivers, the size of the radar apparatus may be large and power consumption may be large.

SUMMARY

The present disclosure is to finely adjust the delay between a transmission clock and a reception clock of a pulse radar apparatus to provide a high distance resolution. In addition, the present disclosure is to provide a high azimuth resolution while minimizing the size of the pulse radar apparatus.

An embodiment of the inventive concept provides a radar apparatus including: a controller configured to generate a variable delay control signal whose value varies with time; a clock generator configured to generate a transmission clock and a reception clock variably delayed from the transmission clock by the variable delay control signal; a transmitter configured to emit a transmission pulse through a transmission antenna based on the transmission clock; a first receiver configured to receive a first echo pulse that is the transmission pulse reflected from a target through a first reception antenna and configured to generate a first recovery signal corresponding to the first echo pulse based on the reception clock; and a second receiver configured to receive a second echo pulse that is the transmission pulse reflected from the target through a second reception antenna and configured to generate a second recovery signal corresponding to the second echo pulse based on the reception clock, wherein the controller is configured to obtain a distance of the target based on at least one of a first delay time between the transmission clock and the reception clock corresponding to the first recovery signal and a second delay time between the transmission clock and the reception clock corresponding to the second recovery signal.

In an embodiment, the controller may be further configured to obtain an azimuth angle of the target based on the first delay time and the second delay time as well as a separation distance between the first reception antenna and the second reception antenna.

In an embodiment, the separation distance may be at least half the wavelength of the center frequency of the transmission pulse.

In an embodiment, the variable delay control signal may be continuously changed between a predetermined minimum value and a predetermined maximum value.

In an embodiment, the clock generator may include: a first delay element configured to delay a reference clock based on a first delay control signal to generate the transmission clock; a second delay element configured to delay the reference clock based on a second delay control signal to generate the reception clock; a phase comparator configured to compare a phase of the transmission clock and a phase of the reception clock to output a phase comparison output signal; and an error amplifier configured to amplify a difference between the phase comparison output signal and the variable delay control signal to output the second delay control signal.

In an embodiment, the first receiver may include: a low noise amplifier configured to amplify the first echo pulse; a sampler configured to sample the amplified first echo pulse in response to the reception clock to output a sampled signal; a variable gain amplifier configured to amplify the sampled signal; and an analog to digital converter configured to convert the amplified sampled signal into a digital signal to output the first recovery signal.

In an embodiment, the transmitter may include an oscillator configured to adjust a center frequency and a bandwidth of the transmission pulse.

In an embodiment, the variable delay control signal may be generated according to a predetermined period, and the controller may be further configured to output a control period signal synchronized with the predetermined period.

In an embodiment of the inventive concept, a radar apparatus includes: a controller configured to generate a variable delay control signal whose value varies with time; a clock generator configured to generate a transmission clock and a reception clock variably delayed from the transmission clock by the variable delay control signal; a first transmitter configured to emit a first transmission pulse through a first transmission antenna based on the transmission clock; a second transmitter configured to emit a second transmission pulse through a second transmission antenna based on the transmission clock; and a receiver configured to receive at least one echo pulse that is at least one of the first transmission pulse and the second transmission pulse reflected from a target through a reception antenna, and configured to generate at least one recovery signal corresponding to the at least one echo pulse based on the reception clock, wherein the controller is further configured to obtain a distance of the target based on a delay time between the transmission clock and the reception clock corresponding to the at least one recovery signal.

In an embodiment, the controller may be further configured to obtain an azimuth angle of the target based on information analyzed from a waveform of the at least one recovery signal and a separation distance between the first transmission antenna and the second transmission antenna.

In an embodiment, the variable delay control signal may be continuously changed between a predetermined minimum value and a predetermined maximum value.

In an embodiment, the clock generator may include: a first delay element configured to delay a reference clock based on a first delay control signal to generate the transmission clock; a second delay element configured to delay the reference clock based on a second delay control signal to generate the reception clock; a phase comparator configured to compare a phase of the transmission clock and a phase of the reception clock to output a phase comparison output signal; and an error amplifier configured to amplify a difference between the phase comparison output signal and the variable delay control signal to output the second delay control signal.

In an embodiment, the receiver may include: a low noise amplifier configured to amplify the received echo pulse; a sampler configured to sample the amplified echo pulse in response to the reception clock to output a sampled signal; a variable gain amplifier configured to amplify the sampled signal; and an analog to digital converter configured to convert the amplified sampled signal into a digital signal to output the recovery signal.

In an embodiment of the inventive concept, a radar apparatus includes: a controller configured to generate a variable delay control signal whose value varies with time; a clock generator configured to generate a transmission clock and a reception clock variably delayed from the transmission clock by the variable delay control signal; a transmitter configured to emit a transmission pulse through a transmission antenna based on the transmission clock; a first receiver configured to receive a first echo pulse that is the transmission pulse reflected from a target through a first reception antenna, and configured to generate a first recovery signal corresponding to the first echo pulse based on the reception clock; and a second receiver configured to receive a second echo pulse that is the transmission pulse reflected from a target through a second reception antenna, and configured to generate a second recovery signal corresponding to the second echo pulse based on the reception clock, wherein the controller is further configured to obtain a distance of the target based on at least one of time differences; a first time difference between a minimum distance detection time point and a recovery time point of the first recovery signal; a second time difference between the minimum distance detection time point and a recovery time point of the second recovery signal.

In an embodiment, the controller may be further configured to obtain an azimuth angle of the target based on a difference between a first target distance obtained using the first time difference and a second target distance obtained using the second time difference.

In an embodiment, the clock generator may include: a first delay element configured to delay a reference clock based on a first delay control signal to generate the transmission clock; a second delay element configured to delay the reference clock based on a second delay control signal to generate the reception clock; a phase comparator configured to compare a phase of the transmission clock and a phase of the reception clock to output a phase comparison output signal; and an error amplifier configured to amplify a difference between the phase comparison output signal and the variable delay control signal to output the second delay control signal.

In an embodiment, the first receiver may include: a low noise amplifier configured to amplify the first echo pulse; a sampler configured to sample the amplified first echo pulse in response to the reception clock to output a sampled signal; a variable gain amplifier configured to amplify the sampled signal; and an analog to digital converter configured to convert the amplified sampled signal into a digital signal to output the first recovery signal.

In an embodiment, the variable delay control signal may be a signal that is linearly increased or decreased between a predetermined minimum value and a predetermined maximum value.

In an embodiment, the variable delay control signal may be a signal that is non-linearly increased or decreased between a predetermined minimum value and a predetermined maximum value.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
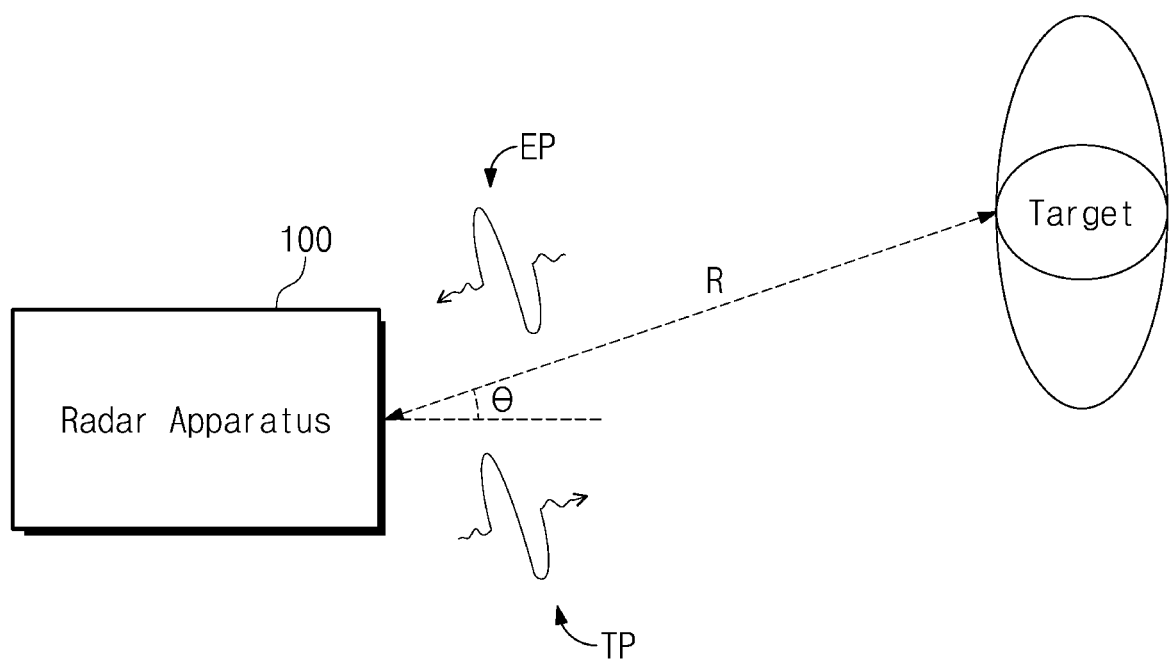
FIG. 1 is a view illustrating a schematic operation of a radar apparatus according to an embodiment of the inventive concept.

Hereinafter, embodiments of the inventive concept will be described in more detail with reference to the accompanying drawings. In the description below, details such as detailed configurations and structures are simply provided to help overall understanding. Therefore, without departing from the technical idea and scope of the inventive concept, modifications on embodiments described in this specification may be performed by those skilled in the art. Furthermore, descriptions of well-known functions and structures are omitted for clarity and conciseness. The terms used herein are defined in consideration of functions of the inventive concept and are not limited to specific functions. The definition of terms may be determined based on the details in description.

Modules in drawings or detailed description below may be shown in the drawings or may be connected to another component other than components described in detailed description. Each of connections between modules or components may be direct or indirect. Each of connections between modules or components may be a connection by communication or a physical access.

Unless otherwise defined, all terms including technical or scientific meanings used in the specification have meanings understood by those skilled in the art. In general, the terms defined in the dictionary are interpreted to have the same meanings as contextual meanings and unless they are clearly defined in the specification, are not to be interpreted to have ideal or excessively formal meanings.

FIG. 1 is a view illustrating a schematic operation of a radar apparatus according to an embodiment of the inventive concept. Referring to FIG. 1, a radar apparatus 100 may emit a transmission pulse TP. Alternatively, the radar apparatus 100 may transmit a transmission pulse TP toward the target. For example, the transmission pulse TP may include electromagnetic waves such as radio waves, infrared rays, visible rays, ultraviolet rays, X-rays, and gamma rays.

The radar apparatus 100 may receive an echo pulse EP that is obtained when the transmission pulse TP is reflected on the target and returned. The radar apparatus 100 may analyze the echo pulse EP to obtain information on the target. In an exemplary embodiment, the radar apparatus 100 may obtain the distance (or range) R (hereinafter referred to as the distance R of the target) from the radar apparatus 100 to the target or the azimuth angle θ (hereinafter, referred to as the azimuth angle θ of the target) between the radar apparatus 100 and the target.

The target may be a fixed object or a moving object. The radar apparatus 100 may obtain the position information and the speed information of the object by obtaining the distance R and the azimuth angle θ of the fixed object and the moving object.

In an exemplary embodiment, the radar apparatus 100 may emit a transmission pulse TP based on a transmission clock and recover a received echo pulse EP based on the reception clock. The radar apparatus 100 may adjust the target range of the target by controlling the delay time between the transmission clock and the reception clock. For example, the first delay time between the transmission clock and the reception clock may correspond to the first distance to the target, and the second delay time between the transmission clock and the reception clock may correspond to the second distance to the target. Accordingly, when the echo pulse EP is recovered, the radar apparatus 100 may obtain the distance R of the target based on the delay information between the transmission clock and the reception clock.

The radar apparatus 100 may obtain a distance R of the target by finely controlling the delay time between the transmission clock and the reception clock. A detailed description of the operation in which the radar apparatus 100 obtains the distance R of the target will be described with reference to the drawings described later.

In an exemplary embodiment, the radar apparatus 100 may transmit a transmission pulse TP through a transmitter. The transmission pulse TP may hit the target and reflected and may be an echo pulse EP. The radar apparatus 100 may receive echo pulses EP at different positions through at least two receivers. The radar apparatus 100 may obtain the azimuth angle θ of the target based on the time difference that the echo pulses EP are received.

In another exemplary embodiment, the radar apparatus 100 may emit transmission pulses (TP) at the same time through at least two transmitters. The radar apparatus 100 may receive at least two echo pulses EP that are obtained when the transmission pulses TP are reflected on the target and returned. The radar apparatus 100 may obtain the azimuth angle θ of the target based on the time difference that the echo pulses EP are received.

The radar apparatus 100 may obtain the azimuth angle θ of the target with high resolution through one transmitter and at least two receivers or at least two transmitters and one receiver. A detailed description of the operation in which the radar apparatus 100 obtains the azimuth angle θ of the target will be described with reference to the drawings described later.

Figure 2:
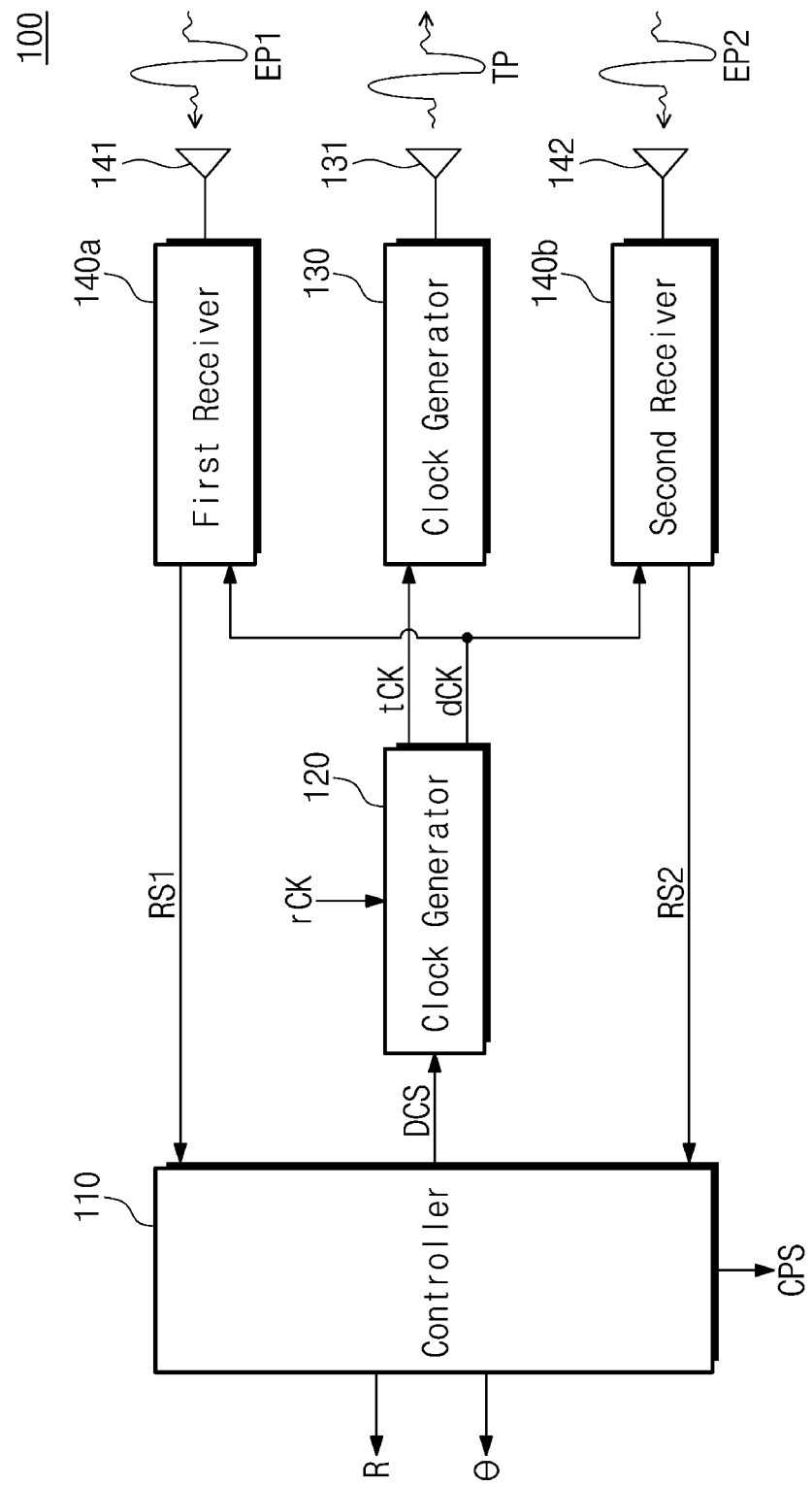
FIG. 2 is a block diagram illustrating one example of the radar apparatus of FIG. 1.

FIG. 2 is a block diagram illustrating one example of the radar apparatus of FIG. 1. Referring to FIG. 2, the radar apparatus 100 may include a controller 110, a clock generator 120, a transmitter 130, a first receiver 140a, and a second receiver 140b.

The controller 110 may generate a variable delay control signal DCS and provide a variable delay control signal DCS to the clock generator 120. The variable delay control signal DCS may be a signal corresponding to the delay time between the transmission clock tCK and the reception clock dCK generated by the clock generator 120. That is, the controller 110 may control the delay time between the transmission clock tCK and the reception clock dCK by using the variable delay control signal DCS.

The clock generator 120 may generate a transmission clock tCK and a reception clock dCK from a reference clock rCK. The clock generator 120 may generate a transmission clock tCK by delaying the reference clock rCK by a predetermined time. The clock generator 120 may generate the reception clock dCK by delaying the reference clock rCK so that the reception clock dCK is variably delayed from the transmission clock tCK by a delay time corresponding to the variable delay control signal DCS. The clock generator 120 may provide the transmission clock tCK to the transmitter 130 and provide the reception clock dCK to the first receiver 140a and the second receiver 140b.

The transmitter 130 may emit a transmission pulse TP through the transmission antenna 131 in response to a transmission clock tCK. For example, the transmitter 130 may emit a transmission pulse TP every rising edge of the transmission clock tCK.

The transmitter 130 may generate an emitting transmission pulse TP. The transmitter 130 may generate a transmission pulse TP having various center frequencies and bandwidths. In order to change the center frequency and bandwidth of the transmission pulse TP, the transmitter 130 may include an oscillator. The oscillator may generate a transmission pulse TP having a specific center frequency and a specific bandwidth according to the control signal provided from the controller 110. Accordingly, when the type of the target to be detected is changed or the situation in which the radar apparatus 100 is applied is changed, the radar apparatus 100 may change the center frequency and the bandwidth. For example, if the target is detected by penetrating the wall, the center frequency of the transmission pulse TP may be set low.

If the emitted transmission pulse TP is reflected on the target, an echo pulse EP may be received at various positions. As shown in FIG. 2, a first echo pulse EP1 may be received at the position of the first receiver 140*a* and a second echo pulse EP2 may be received at the position of the second receiver 140*b*. The time at which the first echo pulse EP1 and the second echo pulse EP2 are received may vary depending on the positions of the first receiver 140*a* and the second receiver 140*b*. For example, if the first receiver 140*a* is closer to the target than the second receiver 140*b*, the first echo pulse EP1 may be received earlier than the second echo pulse EP2.

Hereinafter, for convenience of explanation, it is assumed that the echo pulse EP received by the first receiver 140*a* is the first echo pulse EP1 and the echo pulse EP received by the second receiver 140*b* is the second echo pulse EP2.

The first receiver 140*a* may receive a signal inputted through the first reception antenna 141. The first receiver 140*a* may generate a first recovery signal RS1 corresponding to the received signal value in response to the reception clock dCK. For example, the first receiver 140*a* may generate a first recovery signal RS1 at the rising edge of the reception clock dCK. That is, the first receiver 140*a* may generate a first recovery signal RS1 corresponding to the signal value received at a specific time in response to the reception clock dCK.

For example, when the first echo pulse EP1 is not received at the rising edge of the reception clock dCK (for example, before the first echo pulse EP1 reaches the first reception antenna 141, or when the first echo pulse EP1 reaches the reception antenna 141 and it elapses by the time corresponding to the width of the first echo pulse EP1), the first receiver 140*a* may generate a first recovery signal RS1 corresponding to the noise signal value instead of the first echo pulse EP1. When the first echo pulse EP1 is received at the rising edge of the reception clock dCK (for example, when a specific one of the changing values of the first echo pulse EP1 is received), the first receiver 140*a* may generate a first recovery signal RS1 corresponding to a specific value of the first echo pulse EP1.

The second receiver 140*b* may receive a signal inputted through the second reception antenna 142. The second receiver 140*b* may generate a second recovery signal RS2 corresponding to the received signal value in response to the reception clock dCK. For example, the second receiver 140*b* may generate a second recovery signal RS2 at the rising edge of the reception clock dCK. That is, the second receiver 140*b* may generate a second recovery signal RS2 corresponding to the signal value received at a specific time in response to the reception clock dCK.

For example, when the second echo pulse EP2 is not received at the rising edge of the reception clock dCK (for example, before the second echo pulse EP2 reaches the second reception antenna 142, or when the second echo pulse EP2 reaches the reception antenna 142 and it elapses by the time corresponding to the width of the second echo pulse EP2), the second receiver 140*b* may generate a second recovery signal RS2 corresponding to the noise signal value instead of the second echo pulse EP2. When the second echo pulse EP2 is received at the rising edge of the reception clock dCK (for example, when a specific one of the changing values of the second echo pulse EP2 is received), the second receiver 140*b* may generate a second recovery signal RS2 corresponding to a specific value of the second echo pulse EP2.

Since the positions of the first receiver 140*a* and the second receiver 140*b* are different, the arrival times of the first echo pulse EP1 and the second echo pulse EP2 may be different. Thus, in response to the same reception clock dCK with the rising edge at the same time, the first and second recovery signals RS1 and RS2 generated from the first and second receivers 140*a* and 140*b* may be different from each other. For example, in response to the same reception clock dCK, the first receiver 140*a* generates a first recovery signal RS1 corresponding to the noise signal value and the second receiver 140*b* generates a second echo pulse EP2 corresponding to a specific value of the second recovery signal RS2. Alternatively, in response to the same reception clock dCK, the first receiver 140*a* may generate a first recovery signal RS1 corresponding to a first value of the first echo pulse EP1, and the second receiver 140*b* may generate a second recovery signal RS2 corresponding to a second value of the second echo pulse EP2.

As shown in FIG. 2, the reception antennas 141 and 142 may be positioned on a line with the transmission antenna 131. The transmission antennas 131 may be positioned at the center and the reception antennas 141 and 142 may be disposed to the left and right with respect to the transmission antenna 131. However, the inventive concept is not limited thereto, and the reception antennas 141 and 142 and the transmission antenna 131 may be disposed at various positions. The distance between the reception antennas 141 and 142 may be various values regardless of the wavelength of the center frequency of the transmission pulse TP.

The radar apparatus 100 according to the embodiment of the inventive concept may emit a transmission pulse TP using a transmission clock and then, a receiver generates one recovery signal using a reception clock after a time delay. That is, the radar apparatus 100 may generate a recovery signal from a pair of a transmission clock and a reception clock. The radar apparatus 100 may use a plurality of recovery signals to obtain information such as the distance and azimuth angle of the target.

For example, it is assumed that the target is located at 3 m (pulse round trip time 20 nsec) and that the transmission pulse width of the radar apparatus 100 is 1 nsec. The radar apparatus 100 emits a transmission pulse TP having a pulse width of 1 nsec by a transmission clock. When using a reception clock with a delay of less than 20 nsec, which is the time to hit the target and return, the radar apparatus 100 will receive a noise signal that is regardless of the echo pulse EP. If using a reception clock with a delay of 20 ns compared to the transmission clock, the radar apparatus 100 may recover the beginning portion of the echo pulse EP (i.e., a recovery signal corresponding to the beginning portion of the echo pulse EP may be generated). It is assumed that when the next pair of transmission and reception clocks is generated, the radar apparatus 100 generates transmission and reception clocks with a time delay of 20.01 nsec. Accordingly, the radar apparatus 100 may recover a portion delayed by 0.01 nsec at the beginning portion of the echo pulse EP (i.e., a recovery signal corresponding to a portion delayed by 0.01 nsec at the beginning portion of the echo pulse EP may be generated). Thereafter, the radar apparatus 100 may sequentially generate a pair of transmission and reception clocks having a delay time of 20.02 nsec and 20.03 nsec. If the width of the echo pulse EP caused by the transmission pulse TP having a width of 1 nsec is 1 nsec, the entire echo pulse EP will be recovered from the 100 pairs of transmission clocks and reception clocks. After the entire echo pulse EP is recovered, when a reception clock having a delay of 21 nsec or more is used, the radar apparatus 100 will recover the noise signal irrelevant to the echo pulse EP.

As described above, the transmission pulse TP that is emitted according to the transmission clock tCK may be reflected from the target and received by the first receiver 140*a* and the second receiver 140*b*. In this case, depending on the delay between transmission clock tCK and reception clock dCK, a first recovery signal RS1 or a second recovery signal RS2 corresponding to the first echo pulse EP1 or the second echo pulse EP2 may be generated. That is, if the delay time between the transmission clock tCK and the reception clock dCK is substantially equal to the time that the transmission pulse TP reaches the target and is reflected from the target and reaches the reception antenna, the receiver may start to generate a recovery signal corresponding to the echo pulse EP.

The controller 110 may receive the first recovery signal RS1 from the first receiver 140a and receive the second recovery signal RS2 from the second receiver 140b. The controller 110 may determine whether the first recovery signal RS1 or the second recovery signal RS2 is a value corresponding to the echo pulse EP. When the first recovery signal RS1 or the second recovery signal RS2 is a value corresponding to the echo pulse EP, the controller 110 obtains the distance R of the target based on the delay time between the transmission clock tCK and the reception clock dCK corresponding to the first recovery signal RS1 or the second recovery signal RS2. For example, when the first recovery signal RS1 is equal to or greater than the threshold value, the controller 110 may determine that the first recovery signal RS1 is a value corresponding to the echo pulse EP. In this case, the controller 110 may use a method of removing background noise of the first recovery signal RS1. The controller 110 may obtain the distance R of the target based on the delay time between the transmission clock tCK and the reception clock dCK corresponding to the first recovery signal RS1.

The controller 110 may obtain the azimuth angle θ of the target on the basis of the reception time difference between the first recovery signal RS1 corresponding to the first echo pulse EP1 and the second recovery signal RS2 corresponding to the second echo pulse EP2. The controller 110 may obtain the azimuth angle θ of the target on the basis of the reception time difference between the first recovery signal RS1 corresponding to the first echo pulse EP1 and the second recovery signal RS2 corresponding to the second echo pulse EP2. In this case, the controller 110 may acquire the azimuth angle θ of the target based on a first delay time between the transmission clock tCK and the reception clock dCK corresponding to the first recovery signal RS1 and a second delay time between the transmission clock tCK and the reception clock dCK corresponding to the second recovery signal RS2.

Alternatively, the controller 110 may obtain the distance R of the target from each of the recovered first recovery signal RS1 and second recovery signal RS2 during one period. The controller 110 may obtain the azimuth angle θ of the target based on the difference of the distance R of the target obtained from each of the recovery signals RS1 and RS2.

Alternatively, the controller 110 may obtain the difference between the distance R of the target to the first receiver 140a and the distance R of the target to the second receiver 140b using sum signals and difference signals of signals RS1 and RS2 recovered during one period. The controller 110 may obtain the azimuth angle of the target based on the difference in distance.

The variable delay control signal DCS may be continuously varied with time. The variable delay control signal DCS may be continuously varied between a predetermined minimum value and a predetermined maximum value. The predetermined minimum may correspond to the minimum delay between the transmission clock tCK and the reception clock dCK, and the predetermined maximum value may correspond to the maximum delay time between the transmission clock tCK and the reception clock dCK. The delay time between the transmission clock tCK and the reception clock dCK may correspond to the target range of the target. Accordingly, the predetermined minimum value and the predetermined maximum value may indicate the target range of the radar apparatus 100. That is, the controller 110 may continuously change the target range of the target using the variable delay control signal DCS. Accordingly, the clock generator 120 may generate a reception clock dCK with a continuously changing delay time.

The controller 110 may generate a variable delay control signal DCS that repeats according to a predetermined period. The controller 110 may output a control period signal CPS synchronized with a predetermined period to provide the period information of the variable delay control signal DCS to the outside.

Hereinafter, the operation of the radar apparatus 100 will be described in detail with reference to FIGS. 3 to 6.

Figure 3A:
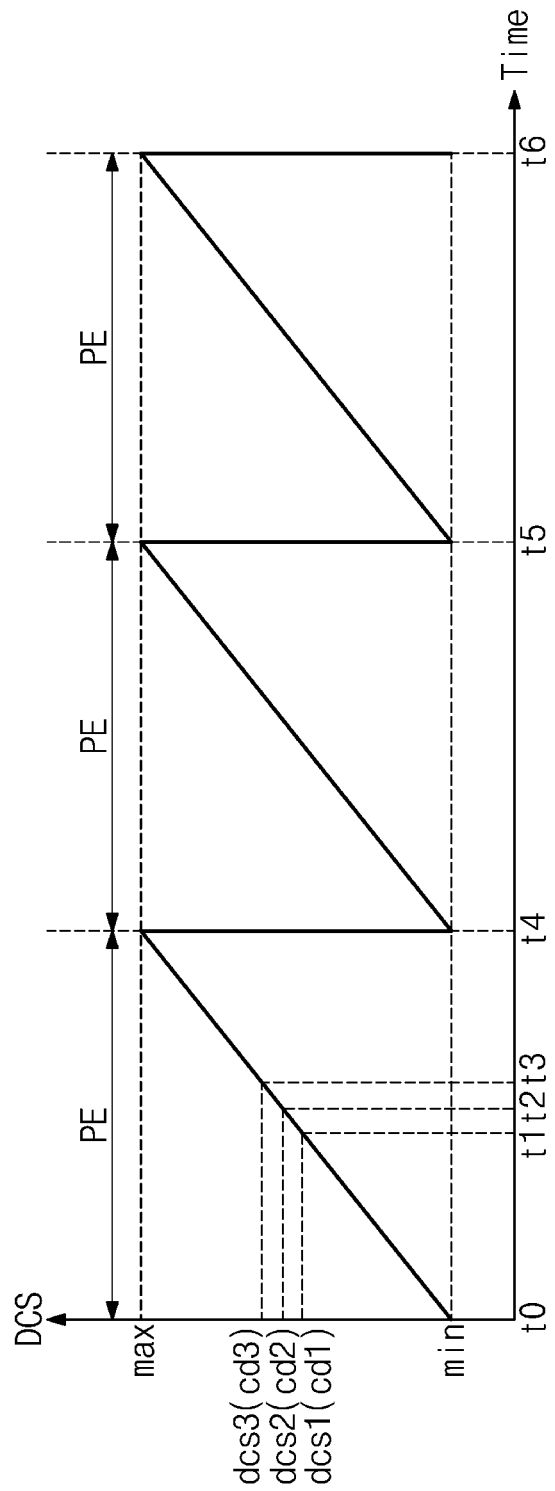
FIGS. 3A and 3B illustrate examples of a variable delay control signal generated from the controller of FIG. 2.
Figure 3B:
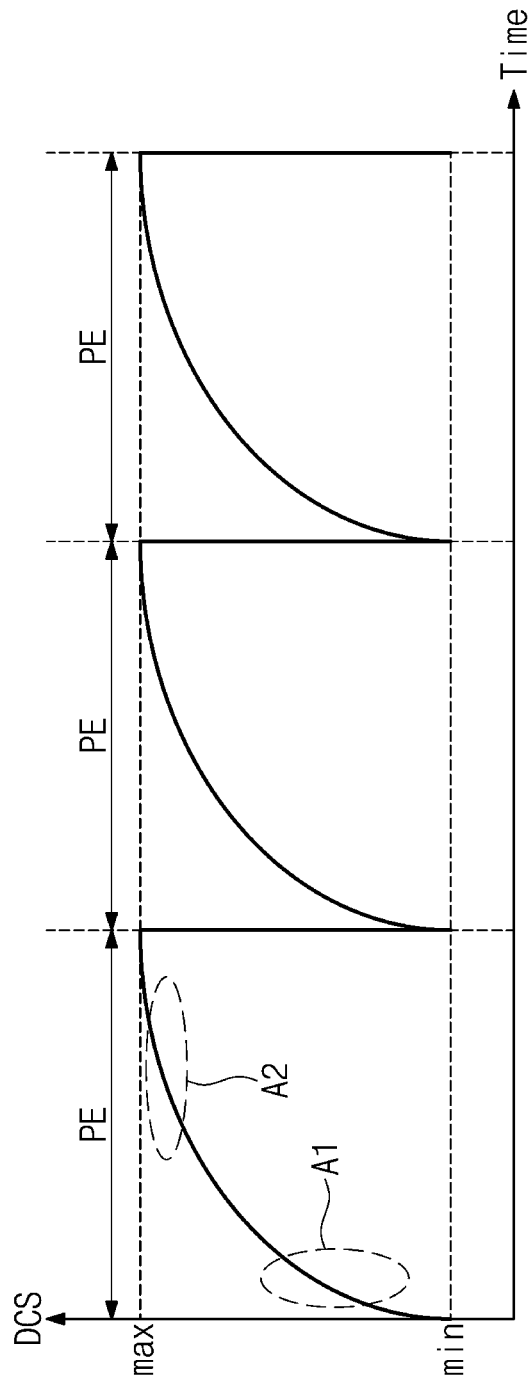

FIGS. 3A and 3B illustrate examples of a variable delay control signal generated from the controller of FIG. 2. In FIGS. 3A and 3B, the horizontal axis represents time and the vertical axis represents the value of the variable delay control signal DCS. For example, the variable delay control signal DCS may be a voltage or current value corresponding to the delay time between the transmission clock tCK and the reception clock dCK.

Referring to FIG. 3A, the variable delay control signal DCS may be continuously varied between a minimum value min and a maximum value max. The variable delay control signal DCS having the minimum value min at time t0 may linearly increase with time and have a maximum value max at time t4. The variable delay control signal DCS may have the minimum value min and the maximum value max repeatedly according to a predetermined period PE. That is, as shown in FIG. 3A, the variable delay control signal DCS may be a sawtooth-shaped signal.

As the variable delay control signal DCS increases from a minimum value min to a maximum value max, the delay time between the transmission clock tCK and the reception clock dCK may increase. Accordingly, the time interval of the rising edge of the reception clock dCK may increase based on the rising edge of the transmission clock tCK, and the target range of the radar apparatus 100 may change from a minimum value to a maximum value. If the target is located between the minimum and maximum values of the target range, the radar apparatus 100 may detect the target based on the variable delay control signal DCS of one period PE.

As shown in FIG. 3A, the variable delay control signal value dcs1 at time t1 corresponds to a clock delay cd1 (hereinafter, it is used as the same meaning as the delay time between the transmission clock tCK and the reception clock dCK). The variable delay control signal value dcs2 at time t2 corresponds to the clock delay cd2. The variable delay control signal value dcs3 at time t3 may correspond to the clock delay cd3.

For example, if the target is located farther than the target range corresponding to the clock delay cd1, at time t1, the echo pulse EP may not be detected based on the reception clock dCK having the clock delay cd1. That is, the first receiver 140a of FIG. 2 may not generate the first recovery signal RS1 corresponding to the first echo pulse EP1 based on the reception clock dCK having the clock delay cd1.

For example, if the target is located within the target range corresponding to the clock delay cd2, at time t2, the echo pulse EP may be detected based on the reception clock dCK having the clock delay cd2. That is, the first receiver 140a of FIG. 2 may generate the first recovery signal RS1 corresponding to the first echo pulse EP1 based on the reception clock dCK having the clock delay cd2.

FIG. 3A shows an example of a variable delay control signal DCS linearly increased from a minimum value min to a maximum value max, but the inventive concept is not limited thereto. For example, the controller 110 may generate a variable delay control signal DCS that is linearly reduced from a maximum value max to a minimum value min. In this way, when the variable delay control signal DCS linearly changes, the radar apparatus 100 may detect the target with the same resolution from the minimum target range to the maximum target range.

Referring to FIG. 3B, the variable delay control signal DCS may be continuously varied between a minimum value min and a maximum value max. The variable delay control signal DCS may increase non-linearly with time between the minimum value min and the maximum value max during one period PE. The variable delay control signal DCS increases abruptly in the area A1 around the minimum value min and gradually increases in the area A2 around the maximum value max.

The controller 110 may generate various types of non-linearly varying variable delay control signals DCS as well as the variable delay control signal DCS shown in FIG. 3B. For example, the controller 110 may generate a variable delay control signal DCS which increases gradually in the area A1 and sharply increases in the area A2. Alternatively, the controller 110 may generate a variable delay control signal DCS which is non-linearly reduced from a maximum value max to a minimum value min. As described above, when the variable delay control signal DCS varies non-linearly, the radar apparatus 100 may detect the target more relatively finer (i.e., with higher resolution) in the target range corresponding to the area where the slope of the variable delay control signal DCS is gentle.

Hereinafter, for convenience of explanation, operations of the clock generator 120, the transmitter 130, and the first and second receivers 140a and 140b of FIG. 2 will be described in detail with reference to the variable delay control signal DCS of FIG. 3A.

Figure 4:
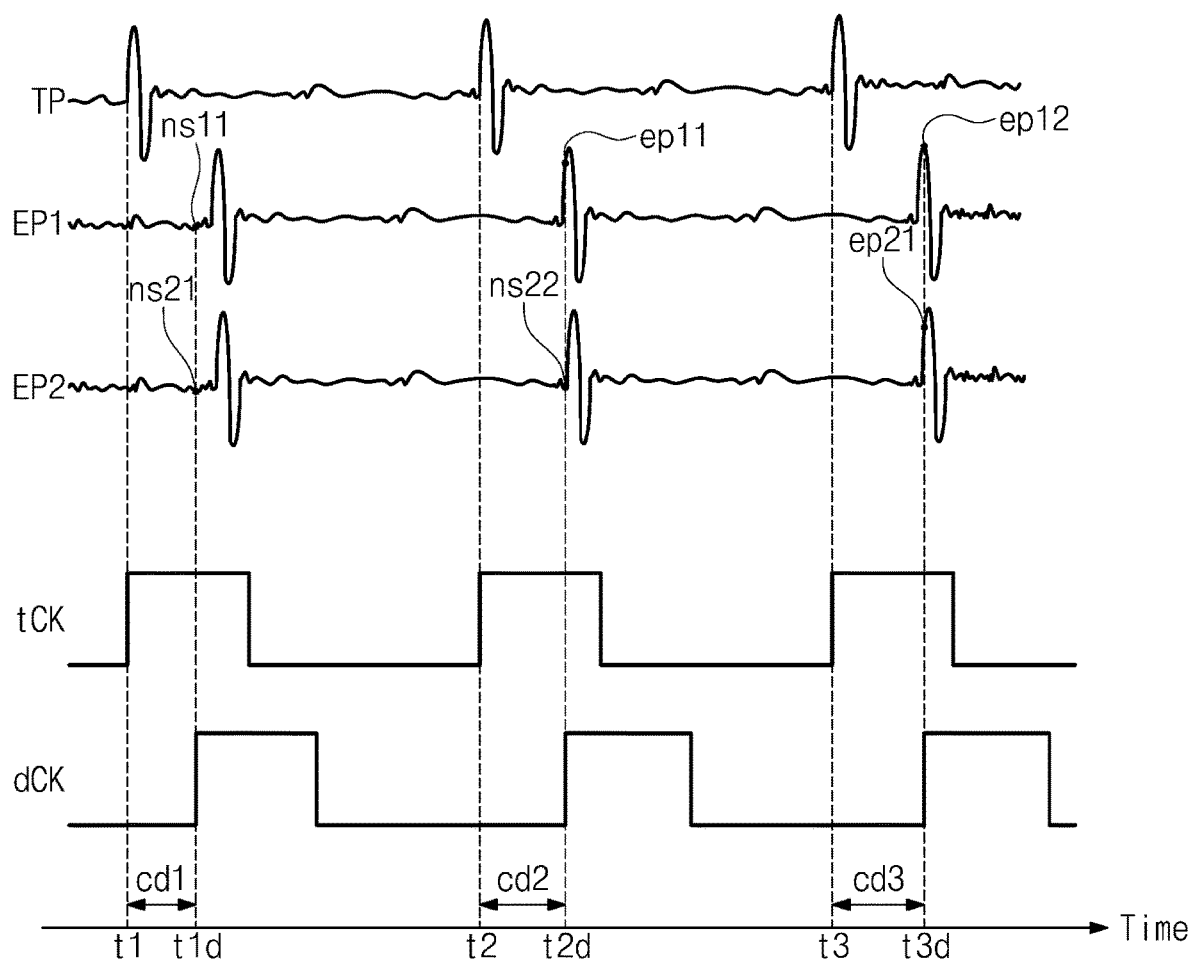
FIG. 4 is a view illustrating an example of clocks and pulses generated according to the variable delay control signal of FIGS. 3A and 3B.

FIG. 4 is a view illustrating an example of clocks and pulses generated according to the variable delay control signal of FIG. 3A. Specifically, the clocks tCK and dCK and the pulses TP, EP1 and EP2 shown in FIG. 4 may be generated according to the variable delay control signal DCS at times t1, t2 and t3 as shown in FIG. 3A. The horizontal axis in FIG. 4 represents time. For convenience of explanation, although the intervals between times t1, t2 and t3 are shown widely, the inventive concept is not limited thereto. For example, in order to obtain a high resolution, the intervals between times t1, t2 and t3 may be very small.

Referring to FIGS. 3A and 4, the clock generator 120 may generate a transmission clock tCK having a rising edge at times t1, t2 and t3. The clock generator 120 may receive the variable delay control signal DCS having the variable delay control signal value dcs1 at time t1. The clock generator 120 may generate a reception clock dCK delayed by the clock delay cd1 based on the variable delay control signal value dcs1. The clock generator 120 may receive a variable delay control signal DCS having a variable delay control signal value dcs2 at time t2. The clock generator 120 may generate a reception clock dCK delayed by the clock delay cd2 based on the variable delay control signal value dcs2. The clock generator 120 may receive the variable delay control signal DCS having the variable delay control signal value dcs3 at time t3. The clock generator 120 may generate a reception clock dCK delayed by the clock delay cd3 based on the variable delay control signal value dcs3. Accordingly, the reception clock dCK may have a rising edge at times t1d, t2d, and t3d.

As shown in FIG. 4, as the variable delay control signal values dcs1, dcs2 and dcs3 increase, the clock delays cd1, cd2 and cd3 may be increased. Thus, the target range of the radar apparatus 100 may be increased.

The transmitter 130 may emit a transmission pulse TP in response to a transmission clock tCK. The transmitter 130 may emit a transmission pulse TP every rising edge t1, t2, and t3 of the transmission clock tCK. If the transmission pulse TP is reflected at the target, the first echo pulse EP1 and the second echo pulse EP2 may be transmitted to the first receiver 140a and the second receiver 140b, respectively.

The first receiver 140a may generate a first recovery signal RS1 from the received signal in response to the reception clock dCK. As shown in FIG. 4, the first echo pulse EP1 may not be received at time t1d and the first echo pulse EP1 may be received at times t2d and t3d. Accordingly, the first receiver 140a generates a value corresponding to the noise value ns11 as a first recovery signal RS1 in response to a reception clock dCK having a clock delay cd1 at time t1d. The first receiver 140a may generate a value corresponding to the first echo pulse value ep11 as a first recovery signal RS1 in response to a reception clock dCK having a clock delay cd2 at time t2d. The first receiver 140a may generate a value corresponding to the first echo pulse value ep12 as a first recovery signal RS1 in response to a reception clock dCK having a clock delay cd3 at time t3d.

The second receiver 140b may generate a second recovery signal RS2 from the received signal in response to the reception clock dCK. As shown in FIG. 4, the second echo pulse EP2 may not be received at times t1d and t2d and the second echo pulse EP2 may be received at time t3d. Accordingly, the second receiver 140b generates a value corresponding to the noise value ns21 as a second recovery signal RS2 in response to a reception clock dCK having a clock delay cd1 at time t1d. The second receiver 140b generates a value corresponding to the noise value ns22 as a second recovery signal RS2 in response to a reception clock dCK having a clock delay cd2 at time t2d. The second receiver 140b may generate a value corresponding to the second echo pulse value ep21 as a second recovery signal RS2 in response to a reception clock dCK having a clock delay cd3 at time t3d.

The first receiver 140a and the second receiver 140b have different relative positions to the target. Due to the path difference according thereto, the reception times of the first echo pulse EP1 and the second echo pulse EP2 may be different. Accordingly, a time difference (e.g., a phase difference) between the first recovery signal RS1 generated in the first receiver 140a and a second recovery signal RS2 generated in the second receiver 140b may be generated.

As shown in FIG. 4, the first receiver 140a may recover the first echo pulse EP1 in response to a reception clock dCK having various clock delays. Similarly, the second receiver 140b may recover the second echo pulse EP2 in response to a reception clock dCK having various clock delays. That is, the first receiver 140a and the second receiver 140b may recover one value corresponding to a specific time point of the echo pulse EP at each rising edge of the reception clock dCK.

Figure 5:
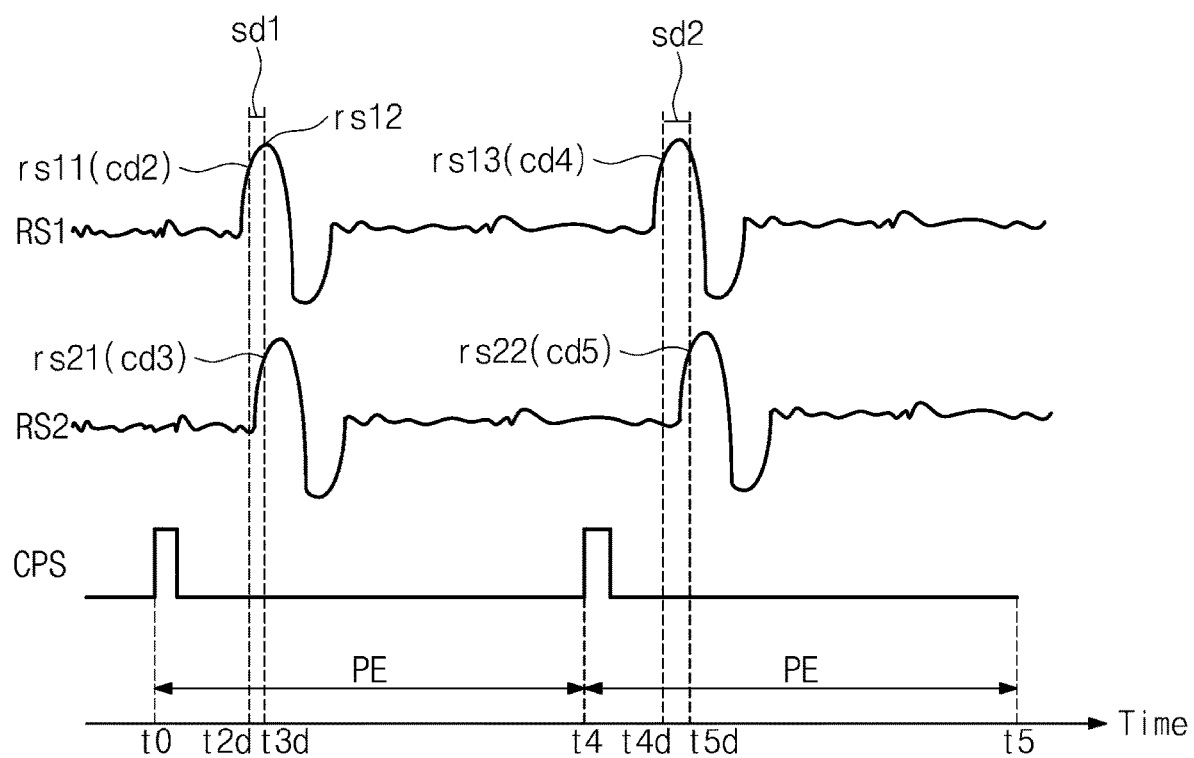
FIG. 5 is a view illustrating an example of recovery signals received by the controller of FIG. 2 and a control period signal CPS outputted by the controller.

FIG. 5 is a view illustrating an example of recovery signals received by the controller of FIG. 2 and a control period signal CPS outputted by the controller. Specifically, FIG. 5 shows a first recovery signal RS1, a second recovery signal RS2, and a control period signal CPS from time t0 to time t5 in FIG. 3A.

Referring to FIG. 3A, FIG. 4, and FIG. 5, a period from time t0 to time t4 is one period PE of the first receiver 140a. During this period, the variable delay control signal DCS is generated and the first receiver 140a may recover the first echo pulse EP1 using the reception clock dCK. For example, the first recovery signal value rs11 at time t2d among the first recovery signals RS1 corresponds to the first echo pulse value ep11. In the same manner, the first recovery signal value rs12 at time t3d may correspond to the first echo pulse value ep12.

In this manner, the first receiver 140a may recover the first echo pulse EP1 during one period PE from time t4 to time t5. Accordingly, the controller 110 may receive the first recovery signal RS1 values of FIG. 5 from the first receiver 140a for one period from time t0 to time t5.

The controller 110 may determine a section corresponding to the first echo pulse EP1 of the first recovery signal RS1. For example, since the magnitude of the noise signal is generally smaller than the magnitude of the echo pulse EP, the controller 110 may determine that the values of the first recovery signal RS1, which are greater than or equal to the threshold value indicating the specific size, correspond to the first echo pulse EP1. For example, as shown in FIG. 5, the controller 110 may determine the first recovery signal value rs13 received at time t2d and the first recovery signal value rs11 received at time t4d as a value corresponding to the first echo pulse EP1.

The controller 110 may obtain the distance R of the target based on the first recovery signal value rs11 for one period PE from time t0 to time t4. The controller 110 may obtain the distance R of the target based on the first recovery signal value rs13 for one period PE from time t4 to time t5. For example, the controller 110 may obtain the distance R of the target at time t4 from time t0 using the clock delay cd2 corresponding to the first recovery signal value rs11. For example, the controller 110 may obtain the time from the time point corresponding to the minimum target range of one period PE to the recovery time point of the first recovery signal value rs11. The controller 110 may obtain the distance R of the target using the ratio of the obtained time to the value of one period PE. In detail, the controller may obtain the distance R of the target based on at least one of time ratios: i) A first time ratio between a period PE of the delay control signal DCS to a first time difference—a minimum distance detection time point to a first time point of first recovery signal RS1; ii) A second time ratio between a period PE of the delay control signal DCS to a second time difference—a minimum distance detection time point to a second time point of second recovery signal RS2.

Alternatively, the controller 110 may obtain the distance R of the target from the reception time of each of the recovered first recovery signal RS1 and second recovery signal RS2 during one period. Hereinafter, the operation in which the controller 110 obtains the distance R of the target will be described in detail with reference to FIG. 5.

FIG. 5 shows the signals RS1 and RS2 including values received from pairs of a plurality of transmission clocks and reception clocks. Thus, these pulses are shown in the period PE of the variable delay control signal which is much longer than the period of the transmission pulse TP and the echo pulse EP. The variable delay control signal DCS is linearly increased between the minimum value and the maximum value of the delay. That is, the radar apparatus 100 linearly detects a target range corresponding to the minimum value of the delay and a target range corresponding to the maximum value of the delay during the period PE of the variable delay control signal. The specific time of the period PE of the variable delay control signal may correspond to a specific target range between a minimum target range and a maximum target range. From the recovered signal, the radar apparatus 100 may specify the position of the echo pulse EP. As one example of the method of specifying the position of the echo pulse EP, the controller 110 may specify the start point of the recovery signal value section that is equal to or greater than the threshold value as the position of the echo pulse EP. The position of the specific echo pulse EP corresponds to the specific position of the period (PE) section of the variable delay control signal. Accordingly, the echo pulse EP may correspond to a specific target range between the minimum and maximum target ranges, and the radar apparatus 100 may find the target range of the target.

As another example of the method of specifying the position of the echo pulse EP, the controller 110 may detect an envelope of the echo pulse EP to obtain a range where the envelope exceeds the threshold value, and specify the center of the range where the envelope exceeds the threshold value as the position of the echo pulse EP. As described above, the position of the target may be obtained from the position of the echo pulse EP.

As another example of the method of specifying the position of the echo pulse EP, the controller 110 may square the recovery signal to convert it to an energy signal, and then apply the threshold value to the converted signal. Alternatively, the controller 110 may detect the envelope of the converted signal, determine the range in which the envelope exceeds the threshold value, and specify the center of the range where the envelope exceeds the threshold value as the position of the echo pulse EP.

From time t0 to time t4, the second receiver 140b may recover the second echo pulse EP2 based on the reception clock dCK generated according to the variable delay control signal DCS for one period PE. For example, the second recovery signal value rs21 at time t3d among the second recovery signals RS2 may correspond to the second echo pulse value ep21.

In this manner, from time t4 to time t5, the second receiver 140b may recover the second echo pulse EP2 during one period PE. Accordingly, from time t0 to time t5, the controller 110 may receive the second recovery signal RS2 of FIG. 5 from the second receiver 140b.

The controller 110 may determine a value corresponding to the second echo pulse EP2 of the second recovery signal RS2. For example, as shown in FIG. 5, the controller 110 may determine that the second recovery signal value rs21 received at time t3d and the second recovery signal value rs22 received at time t5d correspond to the second echo pulse EP2.

The controller 110 may obtain the distance R of the target based on the second recovery signal value rs21 for one period PE from time t0 to time t4. The controller 110 may obtain the distance R of the target based on the second recovery signal value rs22 for one period PE from time t4 to time t5. For example, the controller 110 may obtain the distance R of the target using the clock delay cd3 corresponding to the second recovery signal value rs21. Alternatively, the controller 110 may obtain the distance R of the target from the reception time of each of the recovery signals RS1 and RS2 recovered during one period PE.

As described above, in order to obtain the distance R of the target during one period PE from time t0 to time t4, the controller 110 may use at least one of a first recovery signal value rs11 and a second recovery signal value rs21. Since the clock delay cd2 corresponding to the first recovery signal value rs11 is smaller than the clock delay cd3 corresponding to the second recovery signal value rs21, the distance R obtained based on the first recovery signal value rs11 and the distance R obtained based on the second recovery signal value rs21 may be slightly different. The distance R obtained when the position of the target is close and the distance between the receivers is farther may be greatly different. Thus, the distance R of the target may be determined by comparing the distance values of the estimated target from the signals recovered by the plurality of receivers.

In an exemplary embodiment, when the distance R of the target is obtained using both the first recovery signal value rs11 and the second recovery signal value rs21, the controller 110 may obtain the distance R of the target based on the average value of the clock delay cd2 and the clock delay cd3. Alternatively, the controller 110 may obtain a first time from the time point corresponding to the minimum target range of one period PE to the recovery time point of the first recovery signal value rs11 and a second time to a recovery time point of the second recovery signal value rs21. The controller 110 may obtain the distance R of the target using the ratio of the average value of the obtained first time and the second time to the value of one period PE.

The controller 110 may obtain the azimuth angle θ of the target based on the time difference between the first echo pulse EP1 and the second echo pulse EP2. For example, as shown in FIG. 5, the controller 110 may obtain the azimuth angle θ of the target based on the reception time difference sd1 of time t2$d$ at which the first recovery signal value rs11 corresponding to the first echo pulse EP1 is received during one period PE from the time t0 to the time t4 and time t3$d$ at which the second recovery signal value rs21 corresponding to the second echo pulse EP2 is received. The reception time difference sd1 may be calculated from the clock delay cd2 and the clock delay cd3. In this case, the position indicated by the first recovery signal value rs11 in the first recovery signal RS1 and the position indicated by the second recovery signal value rs21 in the second recovery signal RS2 may correspond to each other. That is, the first recovery signal value rs11 and the second recovery signal value rs21 may be the same.

As described above, the controller 110 may specify the position of the echo pulse EP from the recovery signals RS1 and RS2 using various methods. For example, as shown in FIG. 5, the controller 110 determines whether a recovery signal value at a specific time point is greater than or equal to a specific threshold value to specify the position of the echo pulse EP. If the relative positions of the receivers with respect to the target are arranged differently, there may be a time difference between the recovered echo pulses EP in each receiver. This time difference may be caused by a relative path difference with respect to the target. The azimuth angle may be calculated using this path difference. The value of the time difference due to the path difference between recovery signals RS1 and RS2 during one period PE from time t0 to time t4 may be "sd1". The reception time difference sd1 due to the path difference may be converted into a distance. The converted distance may correspond to the path difference. The controller 110 may calculate the azimuth angle θ from the path difference. Alternatively, the controller 110 obtains the first time from the time point corresponding to the minimum target range of one period PE to the recovery time point of the first recovery signal RS1, and obtains the distance R of the first target using the ratio of the obtained first time to the value of one period PE. The controller 110 obtains the second time from the time point corresponding to the minimum target range of one period PE to the recovery time point of the second recovery signal RS2, and obtains the distance R of the second target using the ratio of the obtained second time to the value of one period PE. The controller 110 may obtain the distance corresponding to the reception time difference sd2 from the difference between the distance R of the first target and the distance R of the second target. The controller 110 may calculate the azimuth angle θ from the distance corresponding to the reception time difference sd1.

The controller 110 may obtain the azimuth angle θ of the target based on the reception time difference sd2 of time t4$d$ at which the first recovery signal value rs13 corresponding to the first echo pulse EP1 is received during one period PE from the time t4 to the time t5 and time t3$d$ at which the second recovery signal value rs22 corresponding to the second echo pulse EP2 is received. The reception time difference sd2 may be calculated from the clock delay cd4 and the clock delay cd5.

The controller 110 may convert the reception time difference sd2 into distance. The converted distance may correspond to the path difference. The controller 110 may calculate the azimuth angle θ from the path difference.

Alternatively, the controller 110 obtains the first time from the time point corresponding to the minimum target range of one period PE to the recovery time point of the first recovery signal RS1, and obtains the distance R of the first target using the ratio of the obtained first time to the value of one period PE. The controller 110 obtains the second time from the time point corresponding to the minimum target range of one period PE to the recovery time point of the second recovery signal RS2, and obtains the distance R of the second target using the ratio of the obtained second time to the value of one period PE. The controller 110 may obtain the distance corresponding to the reception time difference sd2 from the difference between the distance R of the first target and the distance R of the second target. The controller 110 may calculate the azimuth angle θ from the distance corresponding to the reception time difference sd2.

As the time difference between the first echo pulse EP1 and the second echo pulse EP2 is smaller, the azimuth angle θ of the target may be small. As shown in FIG. 5, when the reception time difference sd1 is smaller than the reception time difference sd2, the azimuth angle θ of the target during one period PE from time t0 to time t4 may be less than the azimuth angle θ of the target during one period PE from time t4 to time t5.

The controller 110 may output the control period signal CPS synchronized with the predetermined period PE to the outside. For example, as shown in FIG. 5, when the variable delay control signal DCS is the minimum value min (i.e., at time t0), the controller 110 outputs the control period signal CPS of the square wave. Similarly, at time t4 at which the next period PE starts (i.e., when the variable delay control signal DCS is the minimum value min), the controller 110 may output a control period signal CPS of the square wave. When a control period signal CPS is outputted to the outside of the controller 110, various signal processors outside the controller 110 may analyze various information using a control period signal CPS. For example, in order to calculate the distance R of the target from the recovery signal RS, the external signal processor may use the control period signal CPS.

Hereinafter, a method of obtaining the distance R of the target and the azimuth angle θ of the target will be described in detail with reference to FIG. 6.

Figure 6:
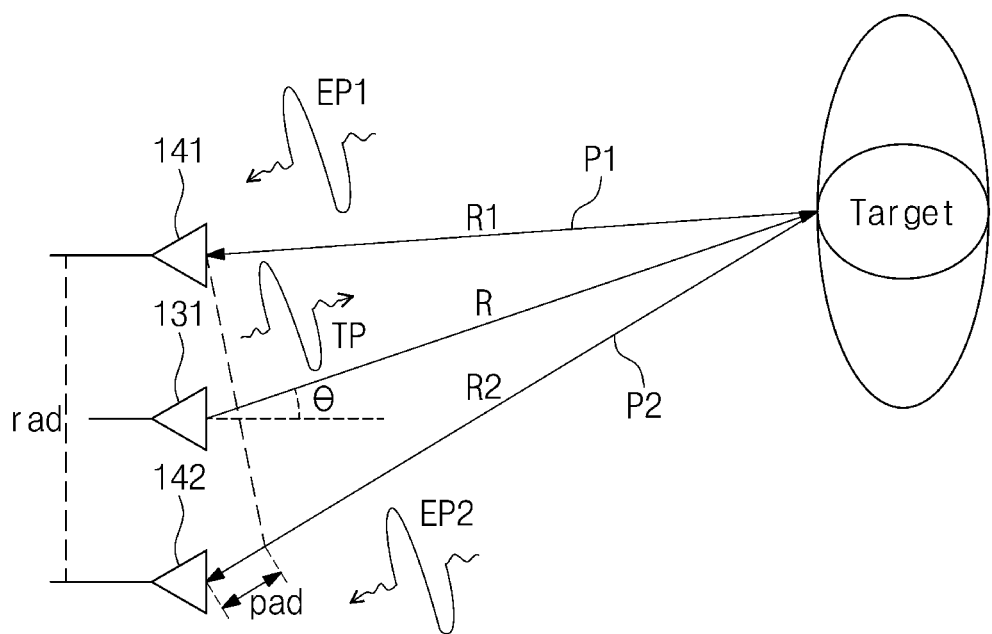
FIG. 6 is a view showing a method of the controller of FIG. 2 to obtain the distance of a target and the azimuth angle of the target.

FIG. 6 is a view showing a method of the controller of FIG. 2 to obtain the distance of a target and the azimuth angle of the target. Generally, since the distance between the transmission antenna 131 and the reception antennas 141 and 142 is much smaller than the distance between the target and the antennas 131, 141, and 142, FIG. 6 may be a view that is different from the actual distance. Hereinafter, it is assumed that the distance between the transmission antenna 131 and the reception antennas 141 and 142 is much smaller than the distance between the target and the antennas 131, 141, and 142.

Referring to FIG. 6, the distance R from the radar apparatus 100 to the target may be assumed to be the distance R from the transmission antenna 131 to the target. As described with reference to FIG. 5, the controller 110 may obtain the distance R1 from the first reception antenna 141 to the target based on the first echo pulse EP1 received through the first reception antenna 141. As described with reference to FIG. 5, the controller 110 may obtain the distance R2 from the first reception antenna 142 to the target based on the first echo pulse EP1 received through the first reception antenna 142. If the distance between the target and the antennas 131, 141 and 142 is much larger than the distance between the transmission antenna 131 and the reception antennas 141 and 142, since the difference between the distance R1 from the first reception antenna 141 to the target and the distance R2 from the second reception antenna 142 to the target is very small compared with the distance R of the target, the distance R of the target may be approximated by the average of the distance R1, the distance R2 or the distance R1 and the distance R2.

The first receiver 140a may receive a signal inputted through the first reception antenna 141. The second reception antenna 142 may receive the second echo pulse EP2 through the second path P2. As shown in FIG. 6, if the azimuth angle θ of the target is not '0', a path difference pad may exist in the first path P1 and the second path P2. Due to the path difference pad, the time at which the first echo pulse EP1 and the second echo pulse EP2 are received may be different.

The path difference pad may be a function for a separation distance rad between the azimuth angle θ of the target and the first reception antenna 141 and the second reception antenna 142. For example, if the distance between the antennas 131, 141, and 142 and the target is much greater than the distance between the transmission antenna 131 and the reception antennas 141 and 142, the path difference pad may be expressed by Equation 1 below.

$$pad = rad \cdot \sin(\theta)$$
$$\theta = \arcsin\left(\frac{pad}{rad}\right)$$
[Equation 1]

As described with reference to FIG. 5, the controller 110 may calculate the time difference in which the first echo pulse EP1 and the second echo pulse EP2 are received, and calculate a path difference pad from the reception time difference. The controller 110 may obtain the azimuth angle θ using the separation distance rad and the path difference pad based on Equation 1.

As described above, the radar apparatus 100 may generate a reception clock dCK based on a continuously changing variable delay control signal DCS. Accordingly, the radar apparatus 100 may precisely adjust the delay time between the transmission clock tCK and the reception clock dCK. The radar apparatus 100 may precisely analyze the delay relationship of the echo pulses EP1 and EP2 recovered from the reception clock dCK and obtain azimuth angle (θ) information of the target with a high resolution. In addition, the radar apparatus 100 may obtain the delay relationship between the distance R of the target and the echo pulses EP1 and EP2 from the reception time of the recovered echo pulses EP1 and EP2 during one period PE.

Since the radar apparatus 100 detects a target through a pulse and uses two reception antennas 141 and 142, the separation distance rad between the two reception antennas 141 and 142 may be freely determined. For example, the separation distance rad may be determined by more than half the wavelength of the center frequency of the transmission pulse TP. If the separation distance rad is increased, the path difference for the target located at the same azimuth angle θ may increase. Accordingly, the radar apparatus 100 may analyze the increased path difference for the same azimuth angle θ. That is, the resolution of the azimuth angle θ may be increased. As shown in Equation 1, if the separation distance rad is increased, the path difference pad may be increased for the same azimuth angle θ.

Figure 7:
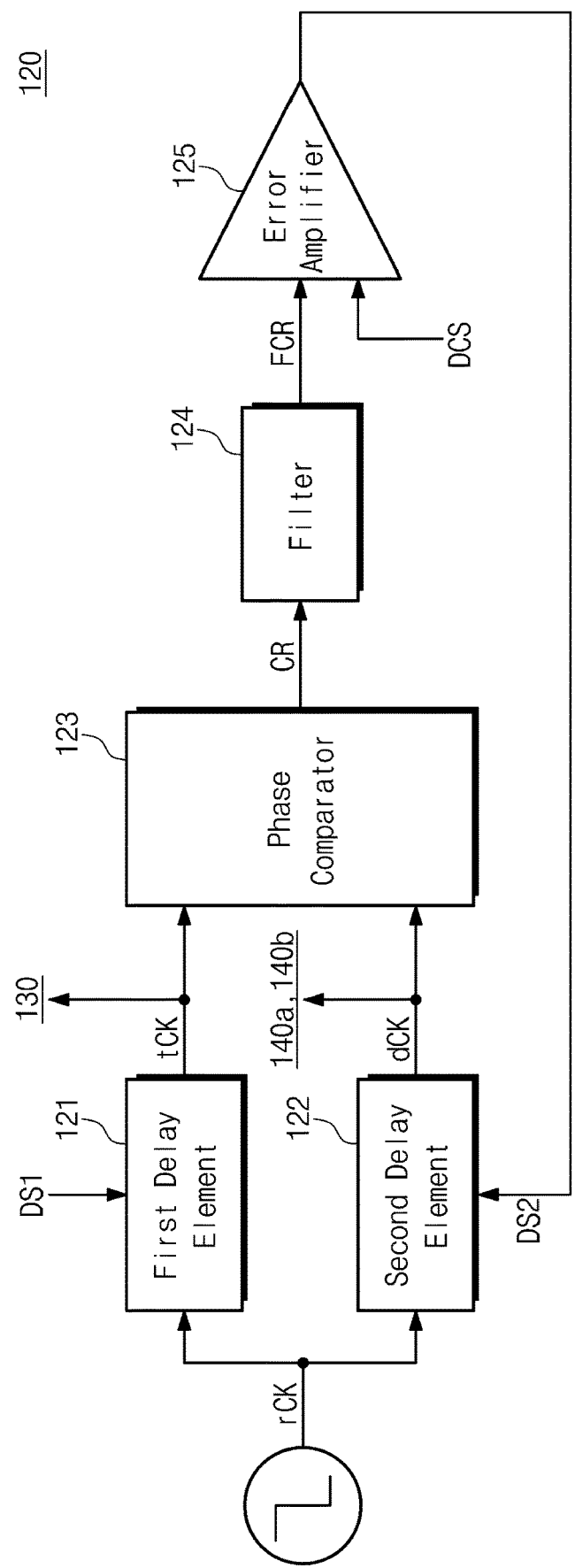
FIG. 7 is a block diagram illustrating the clock generator of FIG. 2.

FIG. 7 is a block diagram illustrating the clock generator of FIG. 2. Referring to FIG. 7, the clock generator 120 may include a first delay element 121, a second delay element 122, a phase comparator 123, a filter 124, and an error amplifier 125.

The first delay element 121 may generate the transmission clock tCK by delaying the reference clock rCK based on the first delay control signal DS1. The first delay control signal DS1 may be a signal corresponding to the delay time between the reference clock rCK and the transmission clock tCK. The first delay control signal DS1 may be a predetermined specific value. In an exemplary embodiment, the first delay control signal DS1 may be provided from the controller 110. The transmission clock tCK outputted from the first delay element 121 may be provided to the transmitter 130 and the phase comparator 123.

The second delay element 122 may generate the reception clock dCK by delaying the reference clock rCK based on the second delay control signal DS2. The second delay control signal DS2 may be a signal corresponding to the delay time between the reference clock rCK and the reception clock dCK. The value of the second delay control signal DS2 may change according to the variable delay control signal DCS. The second delay control signal DS2 may be provided from the error amplifier 125. The reception clock dCK outputted from the second delay element 122 may be provided to the first and second receivers 140a and 140b and the phase comparator 123.

The phase comparator 123 may output the phase comparison output signal CR by comparing the phases of the transmission clock tCK and the reception clock dCK. In an exemplary embodiment, the phase comparator 123 may output a square wave corresponding to a phase difference (i.e., a clock delay) between a transmission clock tCK and a reception clock dCK as a phase comparison output signal CR. In this case, the duty ratio of the square wave may be proportional to the phase difference.

The filter 124 may remove the high frequency components included in the phase comparison output signal CR. For example, the filter 124 may be a low pass filter. The filtered phase comparison output signal FCR outputted through the filter 124 may be provided to the error amplifier 125.

The error amplifier 125 receives the filtered phase comparison output signal FCR and the variable delay control signal DCS. And the error amplifier 125 amplifies the difference between the filtered phase comparison output signal FCR and the variable delay control signal DCS. For example, if the variable delay control signal DCS is greater than the filtered phase comparison output signal FCR (i.e., the delay time between the transmission clock tCK and the reception clock dCK is less than the desired delay time), the error amplifier 125 may output the increased second delay control signal DS2. Accordingly, the second delay element 122 receiving the second delay control signal DS2 may further increase the delay of the reference clock rCK to generate the reception clock dCK. If the variable delay control signal DCS is less than the filtered phase comparison output signal FCR (i.e., the delay time between the transmission clock tCK and the reception clock dCK is greater than the desired delay time), the error amplifier 125 may output the decreased second delay control signal DS2. Accordingly, the second delay element 122 receiving the second delay control signal DS2 may further decrease the delay of the reference clock rCK to generate the reception clock dCK.

As described above, the clock generator 120 may form a feedback path through which the output signal DS2 of the error amplifier 125 is inputted to the second delay element 122. Accordingly, errors of the delay time between the transmission clock tCK and the reception clock dCK and the desired delay time may be reduced. Also, the clock generator 120 may not include a compensation circuit for the first and second delay elements 121 and 122. Accordingly, a miniaturized radar apparatus 100 may be implemented, and may operate at a low power.

Figure 8:
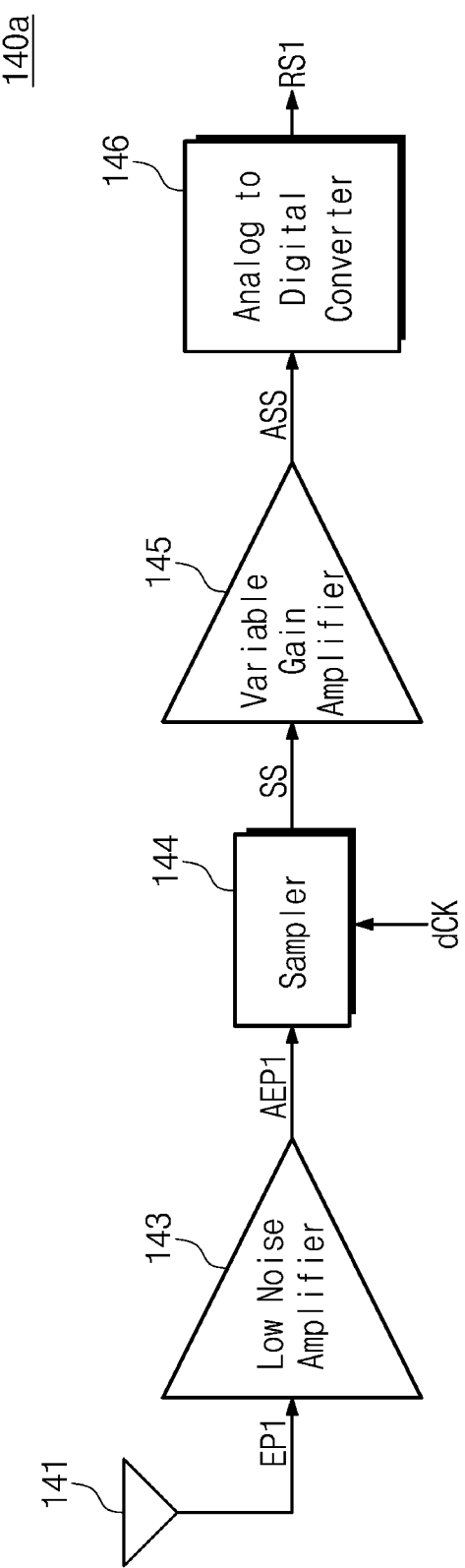
FIG. 8 is a block diagram showing the receiver of FIG. 2.

FIG. 8 is a block diagram showing the receiver of FIG. 2. For convenience of explanation, FIG. 8 will be described with reference to the first receiver 140a. However, the inventive concept is not limited to this, and the second receiver 140b may be implemented in the same manner as the first receiver 140a.

Referring to FIG. 8, the first receiver 140a may include a first reception antenna 141, a low noise amplifier 143, a sampler 144, a variable gain amplifier 145, and an analog to digital converter 146. The first reception antenna 141 may receive the first echo pulse EP1 and may transmit the received first echo pulse EP1 to the low noise amplifier 143.

The low noise amplifier 143 may amplify the first echo pulse EP1. The amplified first echo pulse AEP1 may be provided to the sampler 144. The sampler 144 may sample the amplified first echo pulse AEP1 in response to the reception clock dCK. For example, the sampler 144 may sample the value of the amplified first echo pulse AEP1 at the rising edge of the reception clock dCK. The sampled signal SS may be provided to the variable gain amplifier 145.

The variable gain amplifier 145 may amplify the sampled signal SS. The amplified sampled signal ASS may be provided to the analog to digital converter 146. The analog to digital converter 146 may convert the amplified sampled signal ASS into a digital signal to generate a first recovery signal RS1.

As described above, the first receiver 140a may sample the signal value received through the first reception antenna 141 in response to the reception clock dCK. That is, when the first echo pulse EP1 is received at the time point at which the reception clock dCK is provided, the first receiver 140a may sample a value corresponding to the first echo pulse EP1 and generate a first recovery signal RS1 based on the sampled signal SS.

Figure 9:
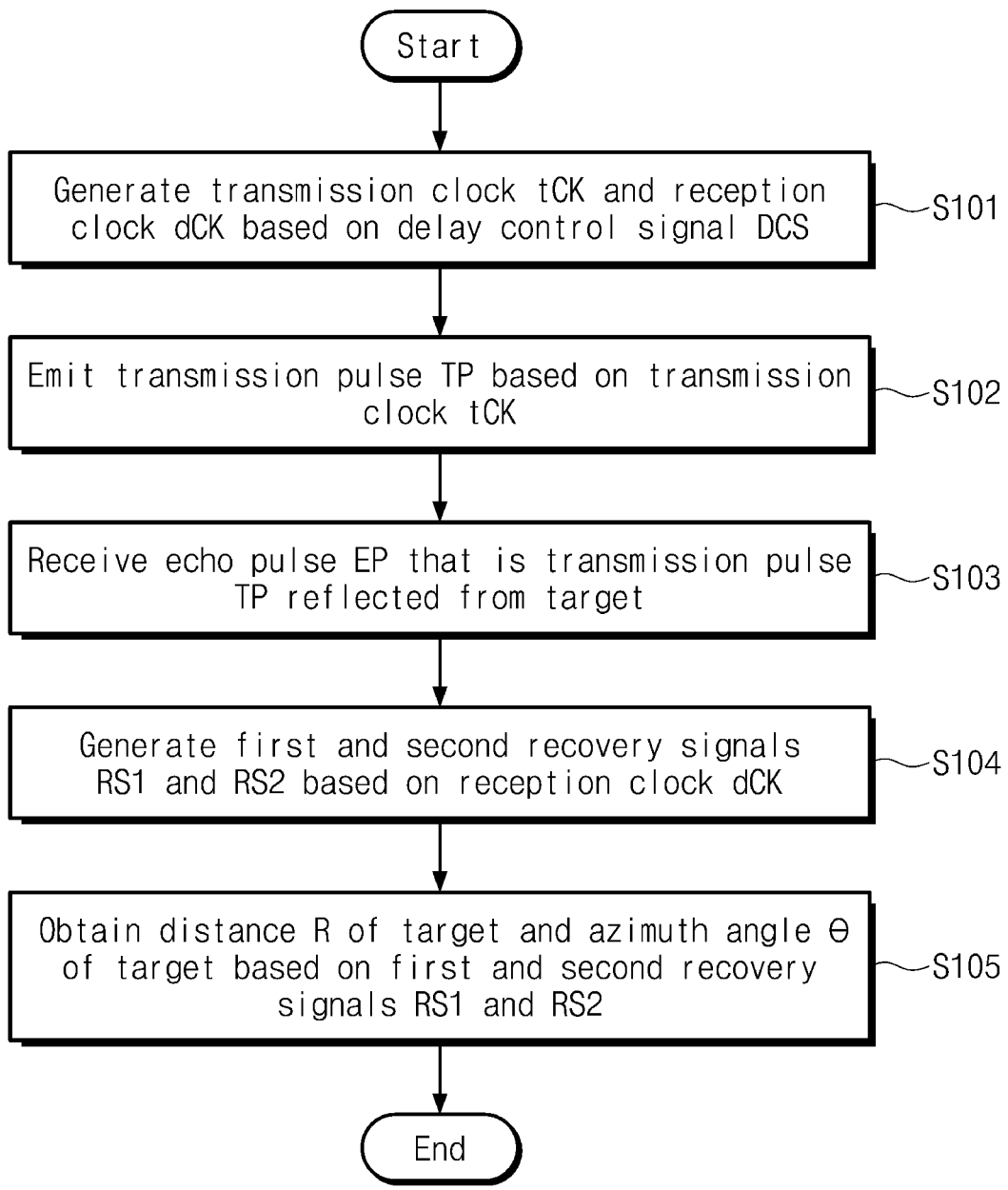
FIG. 9 is a flowchart illustrating an operation of a radar apparatus according to an embodiment of the inventive concept.

FIG. 9 is a flowchart illustrating an operation of a radar apparatus according to an embodiment of the inventive concept. Referring to FIGS. 2 and 9, in operation S101, the radar apparatus 100 may generate a transmission clock tCK and a reception clock dCK based on a variable delay control signal DCS. The variable delay control signal DCS may be a signal continuously varying with time between a predetermined minimum value and a predetermined maximum value. The radar apparatus 100 may generate a reception clock dCK variably delayed from the transmission clock tCK by a delay time corresponding to the variable delay control signal DCS.

In operation S102, the radar apparatus 100 may emit a transmission pulse TP based on a transmission clock tCK. In operation S103, the radar apparatus 100 may receive the echo pulse EP that is the transmission pulse TP reflected from the target. The echo pulse EP received by the first reception antenna 141 of the radar apparatus 100 may be the first echo pulse EP1, and the echo pulse EP received by the second reception antenna 142 may be the second echo pulse EP2. That is, the radar apparatus 100 may receive the first echo pulse EP1 through the first reception antenna 141 and receive the second echo pulse EP2 through the second reception antenna 142.

In operation S104, the radar apparatus 100 may generate the first and second recovery signals RS1 and RS2 based on the reception clock dCK. The radar apparatus 100 may generate a first recovery signal RS1 corresponding to the first echo pulse EP1 and a second recovery signal RS2 corresponding to the second echo pulse EP2 based on the reception clock dCK.

In operation S105, the radar apparatus 100 may obtain the distance R of the target and the azimuth angle θ of the target based on the first and second recovery signals RS1 and RS2. The radar apparatus 100 may obtain the distance R of the target based on the delay time between the transmission clock tCK and the reception clock dCK corresponding to at least one of the recovery signals RS1 and RS2. The radar apparatus 100 may specify the position of the echo pulse EP in the recovery signal and obtain the distance R of the target from the specified position. The radar apparatus 100 may obtain the azimuth angle θ of the target based on the separation distance between the first reception antenna 141 and the second reception antenna 142, the clock delay corresponding to the first recovery signal RS1, and the clock delay corresponding to the second recovery signal RS2. The radar apparatus 100 may obtain the distance R from the first reception antenna 141 to the first target and the distance R from the second reception antenna 142 to the second target, from the reception times of recovery signals RS1 and RS2 received during one period PE. The radar apparatus 100 may obtain the azimuth angle θ based on the difference between the distance R to the first target and the distance R to the second target.

Figure 10:
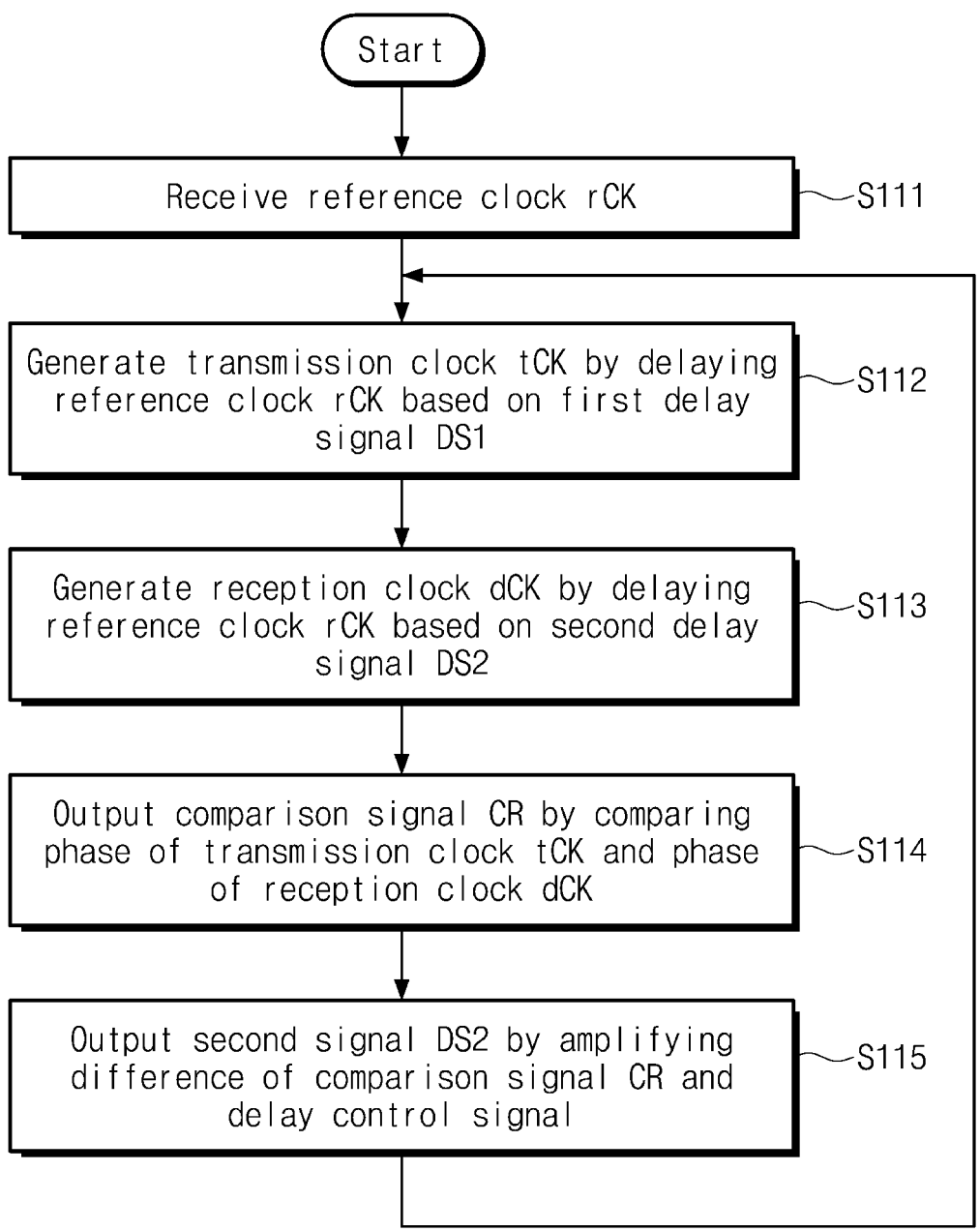
FIG. 10 is a flowchart showing operations of generating a transmission clock and a reception clock by a radar apparatus according to an embodiment of the inventive concept.

FIG. 10 is a flowchart showing operations of generating a transmission clock and a reception clock by a radar apparatus according to an embodiment of the inventive concept. Referring to FIGS. 2 and 10, in operation S111, the radar apparatus 100 may receive a reference clock rCK. In operation S112, the radar apparatus 100 may generate a transmission clock tCK by delaying the reference clock rCK based on the first delay control signal DS1. In operation S113, the radar apparatus 100 may generate a reception clock dCK by delaying the reference clock rCK based on the second delay control signal DS2.

In operation S114, the radar apparatus 100 may output the phase comparison output signal CR by comparing the phases of the transmission clock tCK and the reception clock dCK. In operation S115, the radar apparatus 100 may output the second delay control signal DS2 by amplifying the difference between the phase comparison output signal CR and the variable delay control signal DCS. For example, before amplifying the difference between the phase comparison output signal CR and the variable delay control signal DCS, the radar apparatus 100 may remove the high frequency component of the phase comparison output signal CR. The radar apparatus 100 may amplify the difference between the filtered phase comparison output signal and the variable delay control signal DCS to output the second delay control signal DS2.

Figure 11:
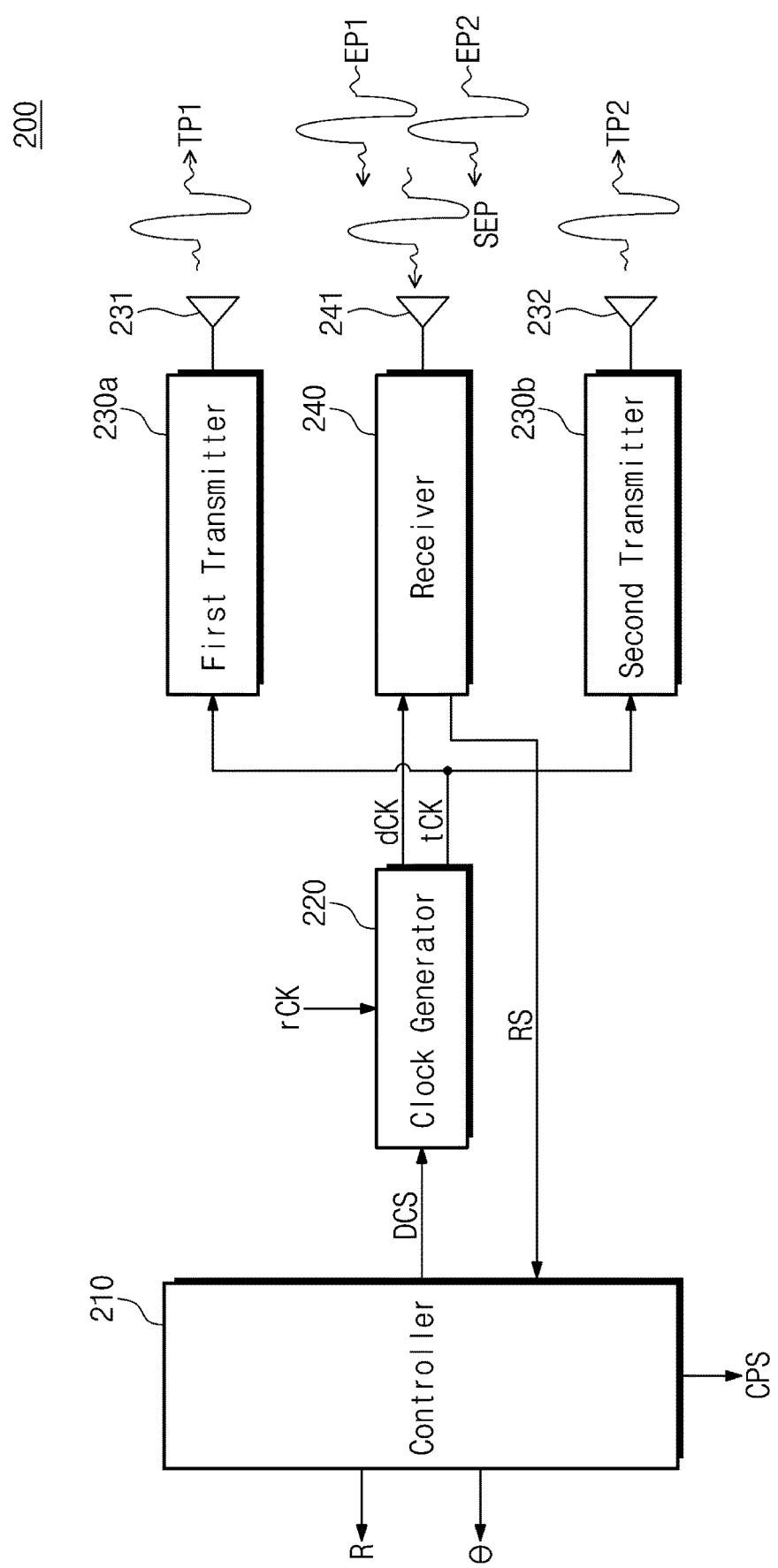
FIG. 11 is a block diagram illustrating another example of the radar apparatus of FIG. 1.

FIG. 11 is a block diagram illustrating another example of the radar apparatus of FIG. 1. Referring to FIG. 11, the radar apparatus 200 may include a controller 210, a clock generator 220, a first transmitter 230a, a second transmitter 230b, and a receiver 240. The operation of controller 210 and clock generator 220 may be similar to that of controller 110 and clock generator 120 of FIG. 2. The operation of the first transmitter 230a and the second transmitter 230b may be similar to that of the transmitter 130 of FIG. 2. The operation of the receiver 240 may be similar to that of the first receiver 140a or the second receiver 140b. Accordingly, redundant description may be omitted. Hereinafter, the radar apparatus 200 of FIG. 11 will be described based on differences from the radar apparatus 100 of FIG. 2.

The controller 210 may generate a variable delay control signal DCS and provide a variable delay control signal DCS to the clock generator 220. The clock generator 220 may generate a transmission clock tCK and a reception clock dCK from a reference clock rCK. The clock generator 220 may generate a reception clock dCK variably delayed from the transmission clock tCK by a delay time corresponding to the variable delay control signal DCS.

The first transmitter 230a may emit a first transmission pulse TP1 through the first transmission antenna 231 in response to a transmission clock tCK. The second transmitter 230b may emit a second transmission pulse TP2 through a second transmission antenna 232 in response to a transmission clock tCK. The first transmitter 230a and the second transmitter 230b may simultaneously emit the first transmission pulse TP1 and the second transmission pulse TP2.

The receiver 240 may receive the echo pulses EP1 and EP2 inputted through the reception antenna 241. The receiver 240 may generate a recovery signal RS corresponding to the received signal value in response to the reception clock dCK. The receiver 240 may receive the first echo pulse EP1 that the first transmission pulse TP1 is reflected on the target and returned and the second echo pulse EP2 that the second transmission pulse TP2 is reflected on the target and returned. When the first echo pulse EP1 and the second echo pulse EP2 are received through one receiver 240, the first echo pulse EP1 and the second echo pulse EP2 may overlap. Accordingly, the echo pulse SEP received through the receiver 240 by the first echo pulse EP1 and the second echo pulse EP2 may be a pulse that the first echo pulse EP1 and the second echo pulse EP2 overlap. The receiver 240 may generate a recovery signal RS corresponding to the overlapping echo pulse SEP and provide it to the controller 210.

The waveform of the recovery signal RS may vary according to the reception time difference of the first echo pulse EP1 and the second echo pulse EP2. The controller 210 may analyze the waveform of the recovery signal RS. The controller 210 may obtain the distance R of the target and the azimuth angle θ of the target based on the analyzed information. In an exemplary embodiment, the controller 210 may determine a recovery signal RS corresponding to the echo pulse SEP. The controller 210 may obtain the distance R of the target based on the delay time between the transmission clock tCK and the reception clock dCK corresponding to the determined recovery signal RS1. Alternatively, the controller 210 may obtain the distance R of the target from the reception time of each of the signal RS recovered during one period PE.

In an exemplary embodiment, the controller 210 may calculate the difference between the time at which the first echo pulse EP1 is received and the time at which the second echo pulse EP2 is received, from the waveform of the recovery signal RS. The controller 210 may obtain the azimuth angle θ of the target based on the calculated reception time difference.

The controller 210 may output a control period signal CPS synchronized with a predetermined period to provide the period information of the variable delay control signal DCS to the outside.

As described above, the radar apparatus 200 may obtain the distance R of the target and the azimuth angle θ of the target using two transmitters 230a and 230b and one receiver 240. That is, when transmitting transmission pulses TP1 and TP2 at different positions at the same time, the radar apparatus 200 may obtain position information and speed information of a target through one receiver 240.

Figure 12:
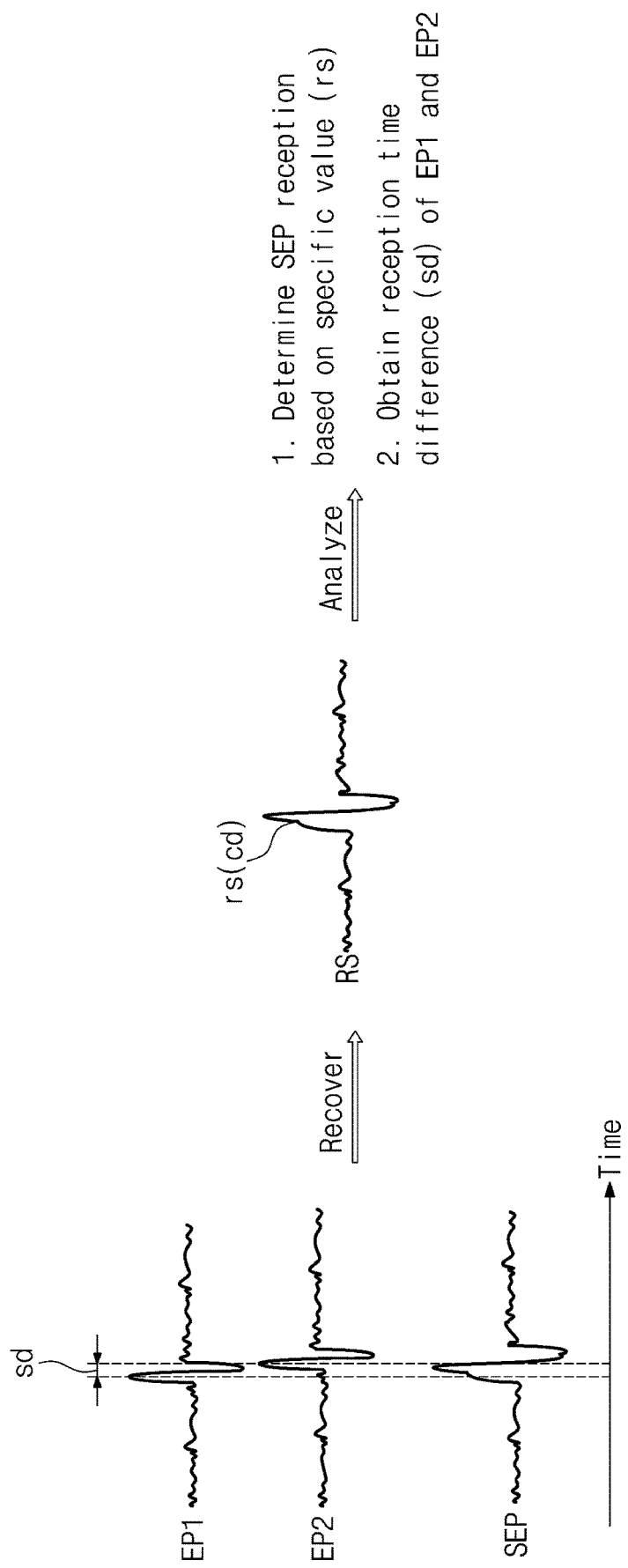
FIG. 12 is a view illustrating an example of a recovery signal generated from the radar apparatus of FIG. 11.

FIG. 12 is a view illustrating an example of a recovery signal generated from the radar apparatus of FIG. 11. Referring to FIGS. 11 and 12, the receiver 240 may receive the first echo pulse EP1 and the second echo pulse EP2. Since the time at which the first transmission pulse TP1 and the second transmission pulse TP2 reach the target may vary depending on the position of the target, the time at which the first echo pulse EP1 is received may be different from the time at which the second echo pulse EP2 is received. As shown in FIG. 12, the first echo pulse EP1 may be received earlier by the reception time difference sd than the second echo pulse EP2.

As described with reference to FIG. 11, the first echo pulse EP1 and the second echo pulse EP2 may overlap. The receiver 240 may generate a recovery signal RS from the overlapping echo pulse SEP. The recovery signal RS may have a value corresponding to the overlapping echo pulse SEP. That is, the waveform of the recovery signal RS may be substantially the same as the waveform of the superposed echo pulse SEP. The waveform of the echo pulse SEP may vary according to the reception time difference of the first echo pulse EP1 and the second echo pulse EP2.

The controller 210 may analyze the waveform of the recovery signal RS. If the magnitude of the specific value rs of the recovered signal RS is equal to or greater than the threshold value, the controller 210 may determine that the echo pulse SEP is received. The controller 210 may obtain the distance R of the target based on the clock delay cd corresponding to the specific value rs. Alternatively, the controller 210 may obtain the distance R of the target from the reception time of each of the signal RS recovered during one period PE.

The controller 210 may analyze the waveform of the recovery signal RS to obtain the reception time difference sd between the first echo pulse EP1 and the second echo pulse EP2. The controller 210 may obtain the azimuth angle θ of the target based on the reception time difference sd.

Figure 13:
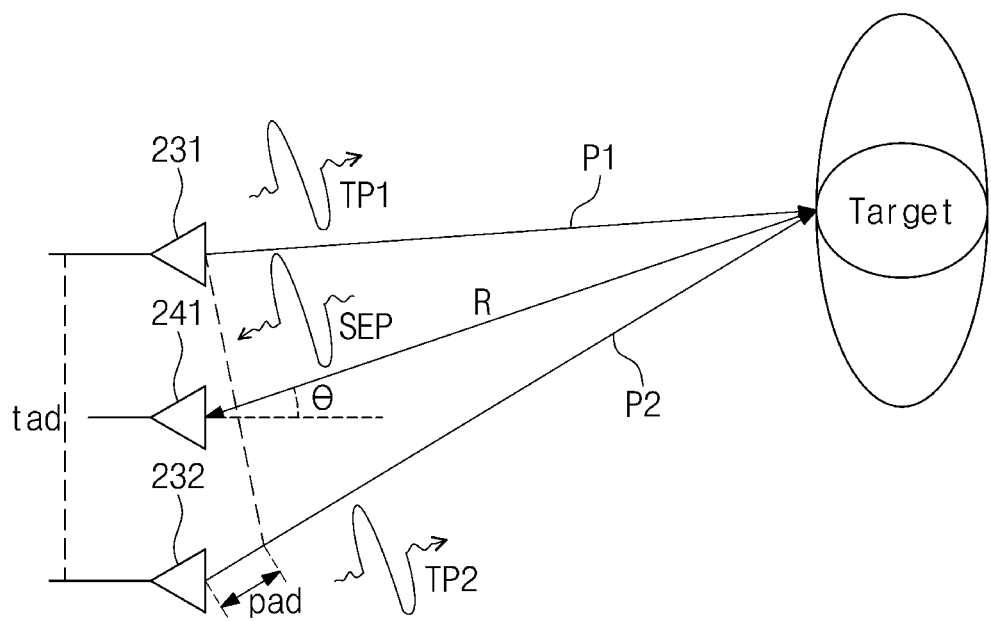
FIG. 13 is a view showing a method of the controller of FIG. 11 to obtain the distance of a target and the azimuth angle of the target.

FIG. 13 is a view showing a method of the controller of FIG. 11 to obtain the distance of a target and the azimuth angle of the target. Unlike what is shown in FIG. 13, the distance between the transmission antennas 231 and 232 and the reception antenna 241 may be much smaller than the distance between the antennas 231, 232 and 241 and the target. Hereinafter, it is assumed that the distance between the transmission antennas 231 and 232 and the reception antenna 241 is much smaller than the distance between the antennas 231, 232, and 241 and the target. The separation distance between the transmission antennas 231 and 232 may be arbitrarily set to a value equal to or greater than a half wavelength of the center frequency of the transmission pulses TP1 and TP2.

Referring to FIG. 13, the distance R from the radar apparatus 200 to the target may be assumed to be the distance R from the reception antenna 241 to the target. As described with reference to FIG. 12, the controller 210 may obtain the distance R from the reception antenna 241 to the target based on the overlapping echo pulse SEP received through the reception antenna 241. If the separation distance between the transmission antennas 231 and 232 is sufficient, the reception antenna 241 may receive the separated echo pulses EP. In this case, as described above, the distance R and azimuth angle θ of the target may be obtained.

The first transmission antenna 231 may transmit the first transmission pulse TP1 through the first path P1. The second transmission antenna 232 may transmit the second transmission pulse TP2 through the second path P2. As shown in FIG. 13, if the azimuth angle θ of the target is not '0', a path difference pad may exist in the first path P1 and the second path P2. Due to the path difference, the time at which the first transmission pulse TP1 and the second transmission pulse TP2 reach the target may be different. Accordingly, the time at which the first echo pulse EP1 according to the first transmission pulse TP1 reaches the reception antenna 241 and the time at which the second echo pulse EP2 according to the second transmission pulse TP2 reaches the reception antenna 241 may be different. The reception antenna 241 may receive the overlapped echo pulse SEP having a different form according to the reception time difference of the first echo pulse EP1 and the second echo pulse EP2.

The path difference pad may be a function for a separation distance tad between the azimuth angle θ of the target and the first transmission antenna 231 and the second transmission antenna 232. For example, if the distance between the target and the antennas 231, 232, and 241 is much greater than the distance between the transmission antennas 231 and 232 and the reception antenna 241, then the path difference pad may be expressed by Equation 2 below.

$$pad = tad \cdot \sin(\theta)$$
$$\theta = \arcsin\left(\frac{pad}{rad}\right)$$
[Equation 2]

As described with reference to FIG. 12, the controller 210 may calculate the reception time difference of the first echo pulse EP1 and the second echo pulse EP2, and calculate a path difference pad from the reception time difference. The controller 210 may obtain the azimuth angle θ using the separation distance tad and the path difference pad based on Equation 2.

As described above, the radar apparatus 200 may generate a reception clock dCK based on a continuously changing variable delay control signal DCS. Accordingly, the radar apparatus 200 may precisely adjust the delay time between the transmission clock tCK and the reception clock dCK. The radar apparatus 200 may recover the overlapping echo pulse SEP based on the reception clock dCK, and precisely analyze the delay relationship of the first and second echo pulses EP1 and EP2 from the recovery signal RS. Accordingly, the radar apparatus 200 may obtain the azimuth angle (θ) information of the target with high resolution.

As described above, the radar apparatus according to embodiments of the inventive concept may include at least two reception antennas or at least two transmission antennas. For convenience of explanation, although two reception antennas or two transmission antennas are shown arranged in a vertical direction, the inventive concept is not limited thereto. The reception antenna and transmission antenna of the inventive concept may be arranged in various directions and at various intervals.

The components of the radar apparatus according to the embodiments of the inventive concept described above may be implemented in the form of software, hardware, or a combination thereof. Exemplarily, software may be machine code, firmware, embedded code, and application software. For example, hardware may include an electrical circuit, an electronic circuit, a processor, a computer, an integrated circuit, integrated circuit cores, a pressure sensor, an inertial sensor, microelectromechanical systems (MEMS), a passive device, or a combination thereof.

The pulse radar apparatus according to the embodiment of the inventive concept may obtain the target distance and the azimuth angle of the target with high resolution.

Also, according to the embodiment of the inventive concept, a miniaturized pulse radar apparatus may be provided, and an integrated pulse radar apparatus may be implemented with low power.

Although the exemplary embodiments of the inventive concept have been described, it is understood that the inventive concept should not be limited to these exemplary embodiments but various changes and modifications may be made by one ordinary skilled in the art within the spirit and scope of the inventive concept as hereinafter claimed.

What is claimed is:
1. A radar apparatus comprising:
a controller configured to generate a variable delay control signal whose value varies with time;
a clock generator configured to generate a transmission clock and a reception clock variably delayed from the transmission clock by the variable delay control signal;
a transmitter configured to emit a transmission pulse through a transmission antenna based on the transmission clock;
a first receiver configured to receive a first echo pulse that is the transmission pulse reflected from a target through a first reception antenna and configured to generate a first recovery signal corresponding to the first echo pulse based on the reception clock; and
a second receiver configured to receive a second echo pulse that is the transmission pulse reflected from the target through a second reception antenna and configured to generate a second recovery signal corresponding to the second echo pulse based on the reception clock,
wherein the controller is configured to obtain a distance of the target based on at least one of a first delay time between the transmission clock and the reception clock corresponding to the first recovery signal and a second delay time between the transmission clock and the reception clock corresponding to the second recovery signal; and wherein the clock generator comprises:

a first delay element configured to delay a reference clock based on a first delay control signal to generate the transmission clock;

a second delay element configured to delay the reference clock based on a second delay control signal to generate the reception clock;

a phase comparator configured to compare a phase of the transmission clock and a phase of the reception clock to output a phase comparison output signal; and an error amplifier configured to amplify a difference between the phase comparison output signal and the variable delay control signal to output the second delay control signal.

2. The radar apparatus of claim 1, wherein the controller is further configured to obtain an azimuth angle of the target based on the first delay time and the second delay time as well as a separation distance between the first reception antenna and the second reception antenna.

3. The radar apparatus of claim 2, wherein the separation distance is more than half a wavelength of a center frequency of the transmission pulse.

4. The radar apparatus of claim 1, wherein the variable delay control signal is continuously changed between a predetermined minimum value and a predetermined maximum value.

5. The radar apparatus of claim 1, wherein the first receiver comprises:

a low noise amplifier configured to amplify the first echo pulse;

a sampler configured to sample the amplified first echo pulse in response to the reception clock to output a sampled signal;

a variable gain amplifier configured to amplify the sampled signal; and an analog to digital converter configured to convert the amplified sampled signal into a digital signal to output the first recovery signal.

6. The radar apparatus of claim 1, wherein the transmitter comprises an oscillator configured to adjust a center frequency and a bandwidth of the transmission pulse.

7. The radar apparatus of claim 1, wherein the variable delay control signal is generated according to a predetermined period, and the controller is further configured to output a control period signal synchronized with the predetermined period.

8. A radar apparatus comprising:

a controller configured to generate a variable delay control signal whose value varies with time;

a clock generator configured to generate a transmission clock and a reception clock variably delayed from the transmission clock by the variable delay control signal;

a first transmitter configured to emit a first transmission pulse through a first transmission antenna based on the transmission clock;

a second transmitter configured to emit a second transmission pulse through a second transmission antenna based on the transmission clock; and a receiver configured to receive at least one echo pulse that is at least one of the first transmission pulse and the second transmission pulse reflected from a target through a reception antenna, and configured to generate at least one recovery signal corresponding to the at least one echo pulse based on the reception clock, wherein the controller is further configured to obtain a distance of the target based on a delay time between the transmission clock and the reception clock corresponding to the at least one recovery signal; and wherein the clock generator comprises:

a first delay element configured to delay a reference clock based on a first delay control signal to generate the transmission clock;

a second delay element configured to delay the reference clock based on a second delay control signal to generate the reception clock;

a phase comparator configured to compare a phase of the transmission clock and a phase of the reception clock to output a phase comparison output signal; and an error amplifier configured to amplify a difference between the phase comparison output signal and the variable delay control signal to output the second delay control signal.

9. The radar apparatus of claim 8, wherein the controller is further configured to obtain an azimuth angle of the target based on information analyzed from a waveform of the at least one recovery signal and a separation distance between the first transmission antenna and the second transmission antenna.

10. The radar apparatus of claim 8, wherein the variable delay control signal is continuously changed between a predetermined minimum value and a predetermined maximum value.

11. The radar apparatus of claim 8, wherein the receiver comprises:

a low noise amplifier configured to amplify the received echo pulse;

a sampler configured to sample the amplified echo pulse in response to the reception clock to output a sampled signal;

a variable gain amplifier configured to amplify the sampled signal; and an analog to digital converter configured to convert the amplified sampled signal into a digital signal to output the recovery signal.

12. A radar apparatus comprising:

a controller configured to generate a variable delay control signal whose value varies with time;

a clock generator configured to generate a transmission clock and a reception clock variably delayed from the transmission clock by the variable delay control signal;

a transmitter configured to emit a transmission pulse through a transmission antenna based on the transmission clock;

a first receiver configured to receive a first echo pulse that is the transmission pulse reflected from a target through a first reception antenna, and configured to generate a first recovery signal corresponding to the first echo pulse based on the reception clock; and a second receiver configured to receive a second echo pulse that is the transmission pulse reflected from a target through a second reception antenna, and configured to generate a second recovery signal corresponding to the second echo pulse based on the reception clock, wherein the controller is further configured to obtain a distance of the target based on at least one of a first time difference between a minimum distance detection time point and a recovery time point of the first recovery signal and a second time difference between the minimum distance detection time point and a recovery time point of the second recovery signal; and wherein the clock generator comprises:
a first delay element configured to delay a reference clock based on a first delay control signal to generate the transmission clock;
a second delay element configured to delay the reference clock based on a second delay control signal to generate the reception clock;
a phase comparator configured to compare a phase of the transmission clock and a phase of the reception clock to output a phase comparison output signal; and
an error amplifier configured to amplify a difference between the phase comparison output signal and the variable delay control signal to output the second delay control signal.

13. The radar apparatus of claim 12, wherein the controller is further configured to obtain an azimuth angle of the target based on a difference between a first target distance obtained using the first time difference and a second target distance obtained using the second time difference.

14. The radar apparatus of claim 12, wherein the first receiver comprises:
a low noise amplifier configured to amplify the first echo pulse;
a sampler configured to sample the amplified first echo pulse in response to the reception clock to output a sampled signal;
a variable gain amplifier configured to amplify the sampled signal; and
an analog to digital converter configured to convert the amplified sampled signal into a digital signal to output the first recovery signal.

15. The radar apparatus of claim 12, wherein the variable delay control signal is a signal that is linearly increased or decreased between a predetermined minimum value and a predetermined maximum value.

16. The radar apparatus of claim 12, wherein the variable delay control signal is a signal that is non-linearly increased or decreased between a predetermined minimum value and a predetermined maximum value.

* * * * *